US012563256B1

(12) United States Patent
Bao et al.

(10) Patent No.:  US 12,563,256 B1
(45) Date of Patent:  Feb. 24, 2026

(54) AI-GENERATED CONTENT RECOMMENDATION MICRO-DESCRIPTORS

(71) Applicant: ROKU, INC., San Jose, CA (US)

(72) Inventors: Jin Bao, Short Hills, NJ (US); Jing Xie, San Jose, CA (US); Abhishek Bambha, Burlingame, CA (US); Aasish Sipani, Danville, CA (US); Rohit Mahto, San Jose, CA (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 18/913,616

(22) Filed: Oct. 11, 2024

(51) Int. Cl.
　　*H04N 21/43* 　　(2011.01)
　　*H04N 21/431* 　(2011.01)

(52) U.S. Cl.
　　CPC ............................... *H04N 21/4316* (2013.01)

(58) Field of Classification Search
　　None
　　See application file for complete search history.

(56) References Cited

U.S. PATENT DOCUMENTS 8,887,202 B2 * 11/2014 Hunter ............. H04N 21/47217
　　　　　　　　　　　　　　　　　　　725/43
2020/0120393 A1 * 4/2020 O'Callaghan .... H04N 21/44224

2024/0015354 A1　 1/2024 Soh et al.
2024/0069939 A1 * 2/2024 Jonker .................. F16M 13/04
2024/0273227 A1 * 8/2024 Thompson .......... G06F 21/6218

OTHER PUBLICATIONS

Pan Li, Yuyan Wang, Ed H. Chi, Minmin Chen. *Prompt Tuning Large Language Models on Personalized Aspect Extraction for Recommendations.* Jun. 2, 2023, retrieved from https://arxiv.org/abs/2306.01475, 19 pages.

* cited by examiner

*Primary Examiner* — Samira Monshi
(74) *Attorney, Agent, or Firm* — Sterne, Kessler, Goldstein & Fox P.L.L.C.

(57) ABSTRACT

Disclosed herein are system, method, and computer program product embodiments that use artificial intelligence (AI) to generate content recommendation micro-descriptors for use in a content selection graphical user interface (GUI). An embodiment operates by determining whether a content release date derived from stored metadata corresponding to media content is before a training cutoff date of a generative AI model. If so, a first prompt, including content title, content type, and content release year, instructs a generative AI model to generate a first description for the content, which is provided in a second, summarization prompt to the generative AI model to generate a second description for the content. Otherwise, a third prompt including a third description derived from stored metadata is used to generate a fourth description for the content. The second or fourth description is concise, e.g., five tokens or fewer, and is displayed in the content selection GUI.

20 Claims, 13 Drawing Sheets

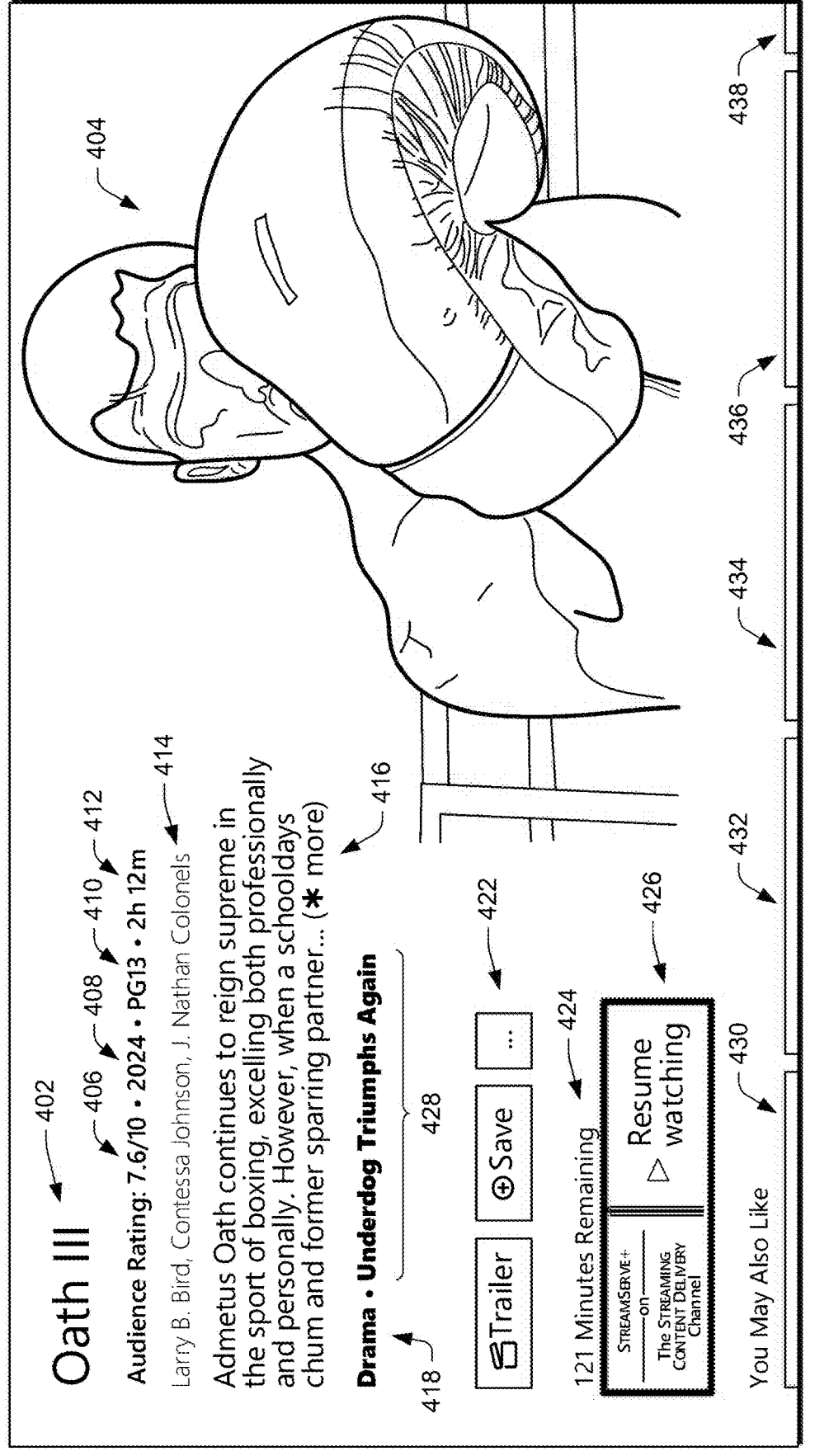

MEDIA CONTENT SELECTION USER INTERFACE – CONTENT DETAIL PREVIEW SCREEN

400

402 — Oath III

404

406 408 410 412
Audience Rating: 7.6/10 • 2024 • PG13 • 2h 12m

414
Larry B. Bird, Contessa Johnson, J. Nathan Colonels

Admetus Oath continues to reign supreme in the sport of boxing, excelling both professionally and personally. However, when a schooldays chum and former sparring partner... (✱ more)

416

418 — Drama • Underdog Triumphs Again

428

422
Trailer     + Save     ...

424

426
121 Minutes Remaining

△ Resume watching

STREAMSERVE+
—on—
The STREAMING
CONTENT DELIVERY
Channel

430

You May Also Like 432     434     436     438

FIG. 4

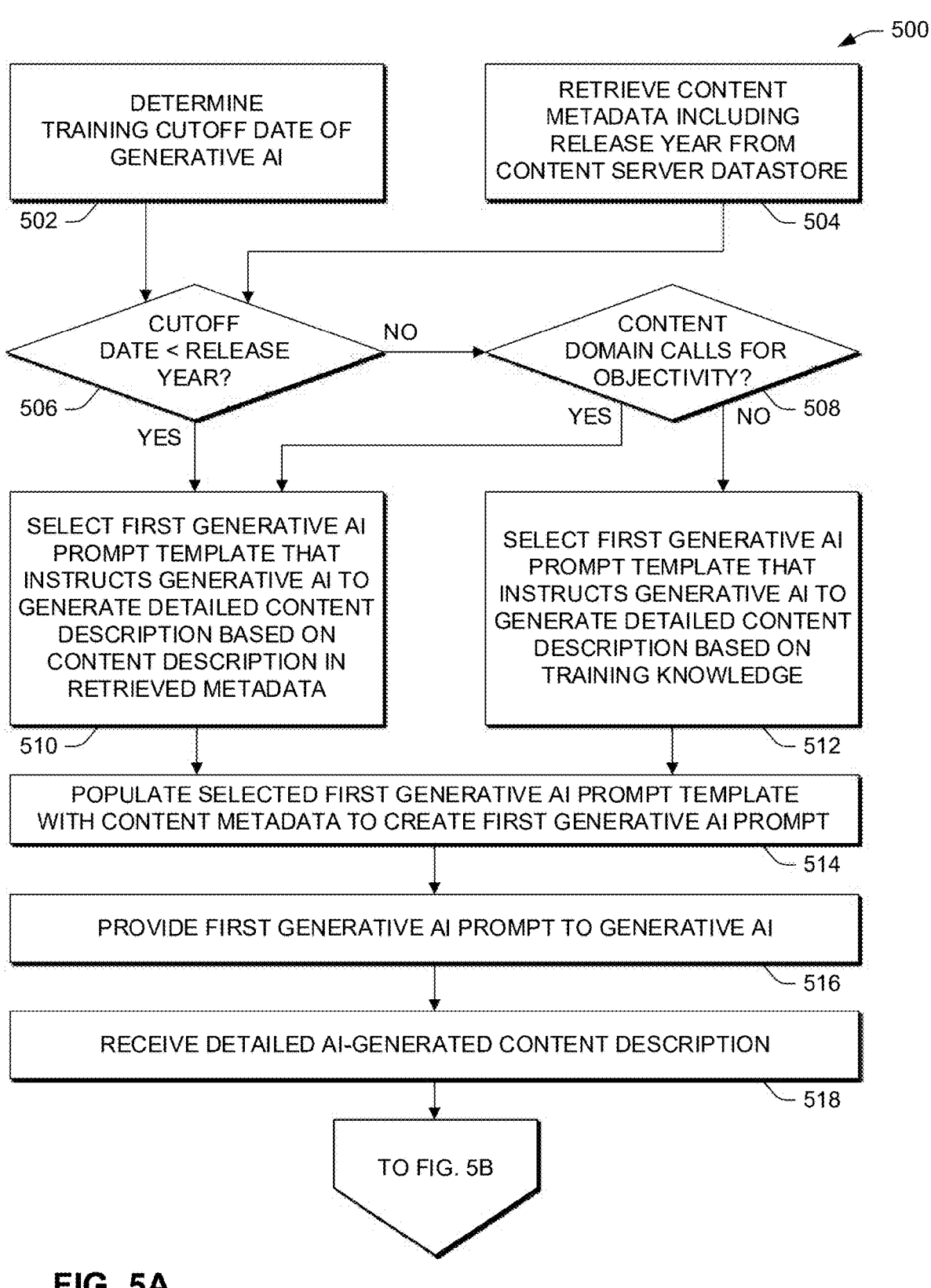

500

DETERMINE
TRAINING CUTOFF DATE OF
GENERATIVE AI

502

RETRIEVE CONTENT
METADATA INCLUDING
RELEASE YEAR FROM
CONTENT SERVER DATASTORE

504

CUTOFF
DATE < RELEASE
YEAR?

506

NO

CONTENT
DOMAIN CALLS FOR
OBJECTIVITY?

508

YES

YES

NO

SELECT FIRST GENERATIVE AI
PROMPT TEMPLATE THAT
INSTRUCTS GENERATIVE AI TO
GENERATE DETAILED CONTENT
DESCRIPTION BASED ON
CONTENT DESCRIPTION IN
RETRIEVED METADATA

510

SELECT FIRST GENERATIVE AI
PROMPT TEMPLATE THAT
INSTRUCTS GENERATIVE AI TO
GENERATE DETAILED CONTENT
DESCRIPTION BASED ON
TRAINING KNOWLEDGE

512

POPULATE SELECTED FIRST GENERATIVE AI PROMPT TEMPLATE
WITH CONTENT METADATA TO CREATE FIRST GENERATIVE AI PROMPT

514

PROVIDE FIRST GENERATIVE AI PROMPT TO GENERATIVE AI

516

RECEIVE DETAILED AI-GENERATED CONTENT DESCRIPTION

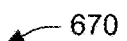
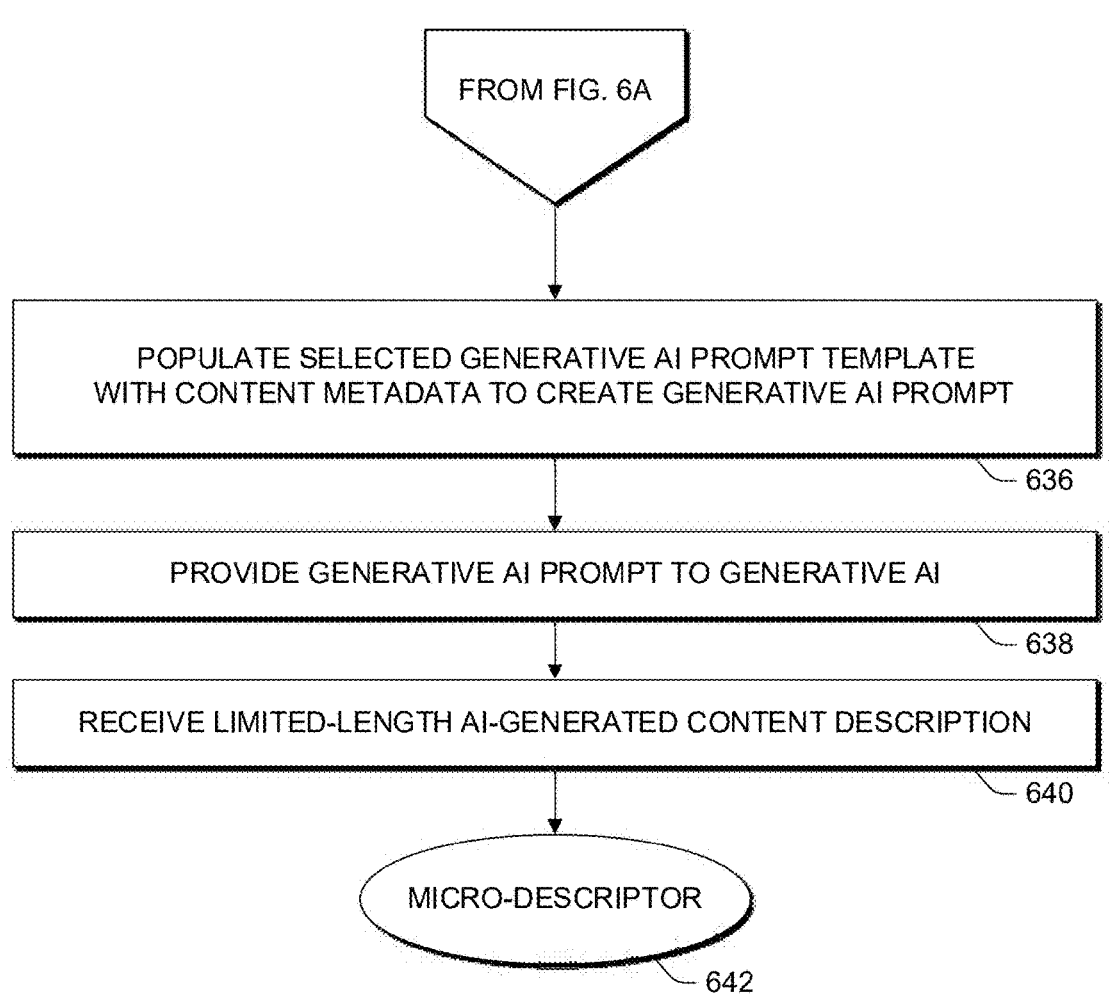
FIG. 6C

— 800

GENERATE DIFFERENT MICRO-DESCRIPTORS FOR A CONTENT OPTION

— 802

PROVIDE DIFFERENT THUMBNAILS FOR THE CONTENT OPTION

— 804

PAIR THE DIFFERENT MICRO-DESCRIPTORS AND THUMBNAILS IN DIFFERENT COMBINATIONS FOR THE CONTENT OPTION

— 806

COLLECT AND ANALYZE USER FEEDBACK

— 808

RETAIN OR DISCARD MICRO-DESCRIPTOR/THUMBNAIL PAIRS BASED ON USER FEEDBACK

— 810

AI-GENERATED CONTENT RECOMMENDATION MICRO-DESCRIPTORS

BACKGROUND

Field

This disclosure is generally directed to media content selection graphical user interfaces, and more particularly to use of generative artificial intelligence (AI) to provide simplified, concise descriptions of streaming or downloadable media content items (referred to herein as "micro-descriptors") to improve efficiency and usability of a media content selection user interface.

SUMMARY

Provided herein are system, apparatus, article of manufacture, method and/or computer program product embodiments, and/or combinations and sub-combinations thereof, for automated AI-based generation of content recommendation micro-descriptors for use in a downloadable or streaming media content menu. In some examples, the generation of the content recommendation micro-descriptors can be a process that is independent of the process of generating corresponding content recommendations themselves.

An example embodiment operates by determining whether a content release date derived from stored metadata corresponding to media content in a data store is before a training cutoff date of a generative AI model. Based on the content release date being before the training cutoff date, a first generative AI prompt template is populated with content metadata of the stored metadata including at least a content title, a content type, and a content release year. This prompt template population provides a first generative AI prompt that includes first natural-language instructions configured to cause the generative AI model to generate a first description for the content. The first generative AI prompt is then provided to the generative AI model to generate the first description for the content. A second generative AI prompt template is then populated with at least the first description. This prompt template population provides a second generative AI prompt that includes second natural-language instructions configured to cause the generative AI model to generate a second description for the content based on the first description. The second generative AI prompt is provided to the generative AI model to generate the second description for the content. The second description is five generative AI tokens or fewer in length. Alternatively, based on the content release date being after the training cutoff date, a third generative AI prompt template is populated with at least a third description derived from the stored metadata. This prompt template population provides a third generative AI prompt that includes third natural-language instructions configured to cause the generative AI model to generate a fourth description for the content based on the third description. The third generative AI prompt is provided to the generative AI model to generate the fourth description for the content. The fourth description is five generative AI tokens or fewer in length. The second description or the fourth description is then displayed in a content selection graphical user interface (GUI) comprising a plurality of thumbnails of recommended content options, upon a user interaction with a thumbnail of the plurality of thumbnails that is associated with the media content.

BRIEF DESCRIPTION OF THE FIGURES

The accompanying drawings are incorporated herein and form a part of the specification.

FIGS. 3 and 4 illustrate example screens of an example graphical user interface for media content selection.

FIGS. 5A and 5B illustrate an example method of micro-descriptor generation using a generative AI.

FIGS. 6A through 6C illustrate an example method of micro-descriptor generation using a generative AI.

In the drawings, like reference numbers generally indicate identical or similar elements. Additionally, generally, the left-most digit(s) of a reference number identifies the drawing in which the reference number first appears.

DETAILED DESCRIPTION

Figure 1:
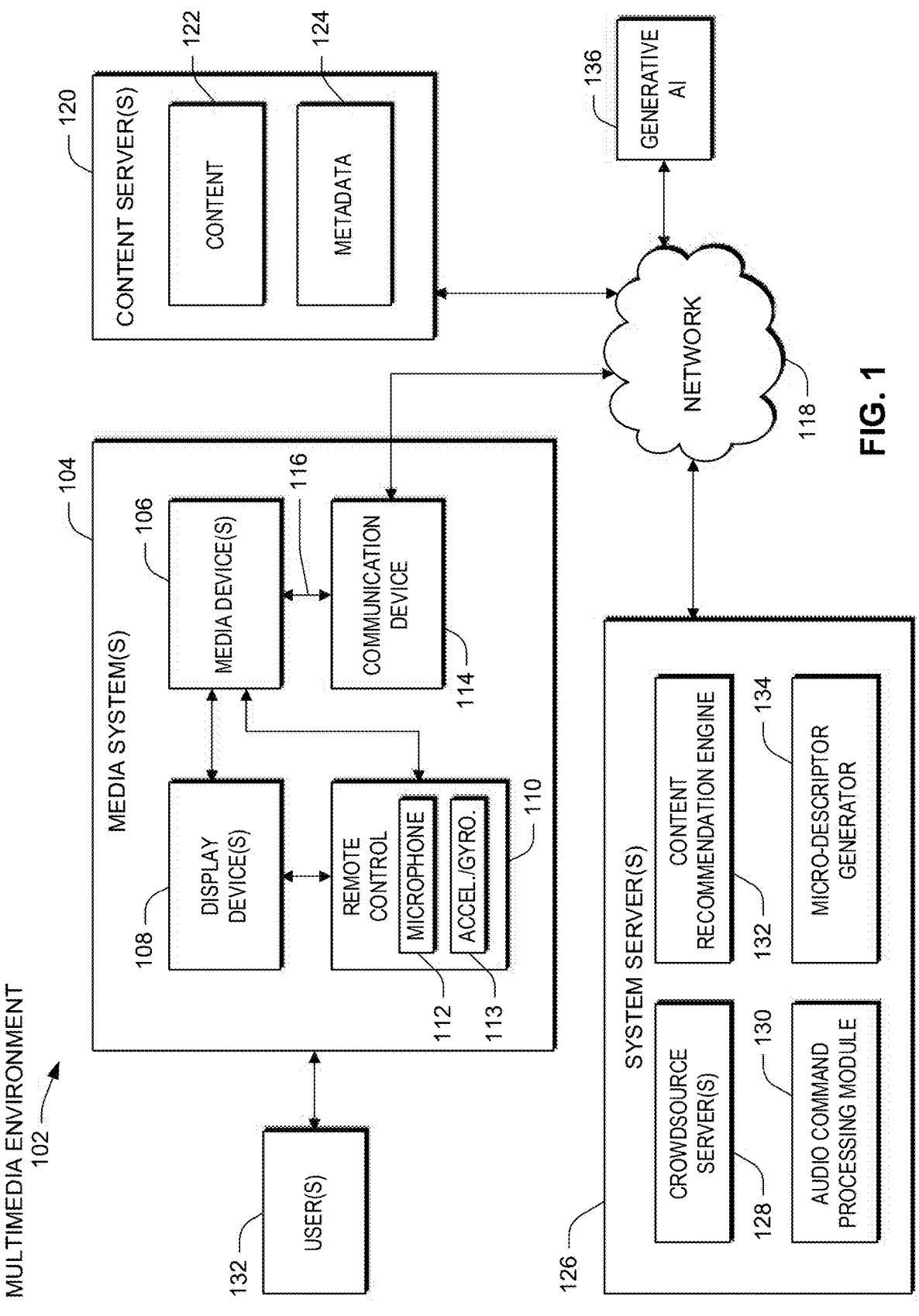
FIG. 1 illustrates a block diagram of a multimedia environment, according to some embodiments.

Provided herein are system, apparatus, device, method and/or computer program product embodiments, and/or combinations and sub-combinations thereof, for AI-generated micro-descriptors for use in a downloadable or streaming media content menu.

As streaming and downloadable content delivery services continue to supplant traditional media distribution systems such as terrestrial broadcast television, cable television, and theatrical distribution of cinematic products, media content selection user interfaces have become a field of technology unto themselves. Improving user experiences and efficiency of user interaction via technological innovation to media content selection user interfaces provides distinguishing benefits and advantages that drive user adoption of, and fidelity to, a given content delivery service.

A content delivery service can provide streaming or downloadable media content to users. The content can include, as examples, movies, television shows, live streams for such programming as news or sporting events, interactive games or other software applications, audio (e.g., songs, albums, audiobooks), still images, and textual content. The content delivery service can provide a user interface, such as a graphical user interface (GUI), that can display selectable content options and can assist a user in navigating what may be a very large library of content (e.g., including thousands or millions of choices at any given time). The selectable content options can be pre-selected and/or previewed in ways that afford varying degrees of preview of content by incorporating into the user interface images (e.g., still or animated thumbnail images) and/or video clips representative of the selectable content options available to a user. The varying degrees of preview can provide a hierarchy of preview information volume, variety, and/or density that can assist a user in selecting a content option for consumption by progressively gauging or building interest until a user selects the content option.

Selectable content options displayed in selection user interface can also include or show metadata (e.g., textual metadata, pictorial metadata, video metadata, and/or animated pictorial metadata) associated with the corresponding content. The textual metadata can include, as examples, a title, a description (e.g., plot summary), year(s) of release or publication, number of seasons (and/or episodes, chapters, and/or parts), genre, runtime length, names of associated creators or companies (e.g., one or more directors, featured performers, producers, or production companies), audience ratings, content ratings, and/or amount of runtime remaining for a user who may have begun consuming the content but who has yet to complete consuming the content. Depending on the design of the media content selection user interface and the position of a user within a pre-selection or preview hierarchy provided by the user interface, different portions or aspects of the metadata can be displayed by the user interface to provide the varying volume, variety, and/or density of preview information.

Descriptions of content options (e.g., plot summaries of the content options), which can be among the metadata, may be provided to the content delivery service by a third party, e.g., a producer or distributor of the content, or an entertainment data vendor. In practice, these descriptions may be several sentences long, and thus may be too long (e.g., may render as too large) to display in a user interface intended to present a user with a large number of content options visible at once on a screen. Rather than displaying overly lengthy, third-party-provided descriptions, a user interface may display micro-descriptors, which can be automatically generated as described herein, to drive user interface efficiency. User interface use of such micro-descriptors can thus represent an improvement to the technology of media content selection user interfaces. Moreover, as described below, the micro-descriptors can serve as user-satisfying, personalized or quasi-personalized explanations as to the recommendation relevance of a recommendation of a particular content option. Accordingly, the generation and display of micro-descriptors, as described herein, can provide a more satisfying user interface experience, which improves the technology of media content selection user interfaces.

As noted above, the content delivery service may provide a large library of selectable content options, with options numbering in the many thousands or millions. Additionally, the content delivery service may wish to promote certain content options, such as new releases, to its users. In consideration of the potentially large number of content options available for user consumption and/or the desire to promote certain content options, the content delivery service may offer a target user one or more recommendations for content to consume (e.g., view or interact with). The recommendations may be generated by a recommendation engine that includes or implements one or more algorithms or models that can take into account such factors as target user preferences, histories, behaviors, and/or demographics; content popularity rankings or change in popularity rankings over a time period across a segment or population of users (e.g., where the segment of users is one to which the target user belongs); and/or a promotion status or value associated with a content option, which may be used to promote content on the service. In some examples, recommended content options may be presented in a featured display portion of the GUI used by the user to interact with the content delivery service and access the content. In some examples, the recommendations rank and/or sort content options for ordered and/or categorized display. The one or more algorithms or models of the content recommendation engine can be, as examples, machine-learning (ML) models such as neural network models or support vector machines, or can be simpler statistical models.

A user targeted with content recommendations may desire to be provided with succinct information offering some explanation of a particular recommendation within the media content option selection user interface. However, the algorithm(s) and/or model(s) used to generate recommendations may be highly sophisticated. It may not be practicable to investigate or interrogate a recommendation model to determine why, precisely, a certain content option is recommended to a particular user, or to a particular class of user. The number and/or complexity of factors that may go in to the recommendation generation, and/or the size or complexity of a model used to generate recommendations, may be so large or so high that no explanation for the recommendation output could be succinctly provided. An explanation that is highly succinct and provides some information about a recommended content option may be satisfactory to a user in this regard, particularly if the explanation provides information that is more than what is already available as standard metadata for the content option. This can be the case even if the recommendation explanation is not reflective of the actual recommendation generation process, e.g., does not render transparent the inner workings of the recommendation engine, which may be unknowable or not describable in a succinct manner. A concise explanation of a particular content option recommendation may be of greater user satisfaction if it customized to the target user of the content option recommendation, but it may have user satisfaction value even if it is not customized to the target user (e.g., even if it is only customized to a class of users to which the user belongs).

A large language model (LLM) or other generative AI model can be used to generate a micro-descriptor of a recommended content option, which can be presented as a succinct explanation of the content option recommendation. Training of a large language model (LLM) or other generative AI model, or connected collection of models, capable of performing content comprehension and summarization tasks, can involve extensive development cycle and data requirements. Recently trained commercially available LLMs are reported to have taken months and tens of millions of dollars of computing resources to train. Once trained, a model, or use of the model with well-tuned prompts, can be refined for specific applications in a shorter period of time. An LLM or other generative AI model may be trained on a large corpus of data, which can include data from large, ever-evolving databases available on the internet, such as movie databases and encyclopedias. The date at which data is harvested from a given source for the training corpus marks a training cut-off date. The LLM or other generative AI model may have no awareness of information made available only after the relevant training cut-off date, unless such information is provided as context data in a prompt to the LLM or other generative AI model. The LLM or other generative AI model may be configured to know a single training cut-off date at which its knowledge is capped or may know different cut-off dates relevant to its different knowledge domains.

Accordingly, a content recommendation system can employ AI-generated (e.g., LLM-generated) micro-descriptors as concise content recommendation explanations to improve user experience when using a media content selection user interface. For example, a media device (e.g., a streaming media device) configured to deliver consumable content to one or more users can be further configured to integrate an LLM or other generative AI model to generate and provide micro-descriptors that are succinctly descriptive of recommended content options and serve to explain a recommendation to a user. This integration can include using an LLM or other generative AI model for metadata extraction and summarization tasks. Advanced moderation models and content filtering systems can be employed to ensure content safety to keep explanations free from explicit language. A comprehensive list of content metadata can be used to avoid mismatches during metadata extraction and summarization. A heuristic method can ensure reliability in metadata extraction by using the LLM or other generative AI model only for data predating the training data cutoff date by reverting to precise internal data sources under circumstances where the LLM or other generative AI model is unlikely to have been trained with information about a particular recommended content option. Different prompt-selection logic can be used to customize the AI generation of micro-descriptors, e.g., to provide appropriate implementation across a variety of content domains (e.g., entertainment content, news content, live sports content, etc.). Micro-descriptors can be integrated in a media content selection user interface in a way that provides a more efficient interaction experience and thus improves the technology of content select user interfaces.

Various embodiments of this disclosure may be implemented using and/or may be part of a multimedia environment 102 shown in FIG. 1. Multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 is described below.

Example Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 can represent a system installed in a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. Terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, as examples, a cable modem or satellite TV transceiver. The media device 106 may communicate with the communication device 114 over a link 116, wherein the link 116 may include wireless (such as Wi-Fi) and/or wired connections.

In various embodiments, the network 118 can include, without limitation, wired and/or wireless intranet, extranet, internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 is configured to wirelessly communicate with the media device 106 and/or display device 108 using cellular, Bluetooth, infrared, etc., or any combination thereof. The remote control 110 may include a microphone 112, which is further described below. The remote control 110 may include one or more accelerometers and/or one or more gyroscopes 113, which can produce remote control motion data that can be used for implicit user profiling, as further described below.

The multimedia environment 102 may include a plurality of content servers 120 (also called content providers, channels, or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, genre (e.g., drama, comedy, documentary), content type (e.g., TV series, movie), short (e.g., multi-sentence) description (e.g., plot summary), audience rating (e.g., expressed as an integer or decimal value out of ten, a number of stars out of five, etc.), content rating (e.g., a Motion Picture Association or Entertainment Software Rating Board rating, such as G, PG, PG-13, R, E, T, M, AO, RP, UR for unrated, etc.), runtime, chapters, production, history, release or publication year or date, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index. Metadata 124 may also include a content domain value or an objectivity flag that may be used in determining the tone of a micro-descriptor generated and used to concisely describe a corresponding content option.

Metadata 124 can also include a micro-descriptor relating to an item of content 122 (e.g., for each item of content 122), as described in greater detail below, but in some examples, metadata 124 stored on content servers 120 does not include micro-descriptors, and micro-descriptors are instead generated by system server(s) 126 and/or media system(s) 104. In some examples, micro-descriptors generated by system server(s) 126 and/or media system(s) 104 can be provided back to content server(s) 120 via network 118 for storage as part of metadata 124.

The multimedia environment 102 may include one or more system servers 126. The system servers 126 may operate to support the media devices 106 from the cloud. The structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing embodiments and, thus, the system servers 126 may include one or more crowdsource servers 128. For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear, or when a foreign language is used), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streamings of the movie, based on the similarity/overlap information collected from the thousands or millions of media systems 104.

The system servers 126 may also include an audio command processing module 130. As noted above, the remote control 110 may include a microphone 112. The microphone 112 may receive audio data from users 132 (as well as other sources, such as the display device 108). In some embodiments, the media device 106 may be audio responsive, and the audio data may represent verbal commands from the user 132 to control the media device 106 as well as other components in the media system 104, such as the display device 108. In some embodiments, the audio data received by the microphone 112 in the remote control 110 is transferred to the media device 106, which is then forwarded to the audio command processing module 130 in the system servers 126. The audio command processing module 130 may operate to process and analyze the received audio data to recognize the verbal command of the user 132. The audio command processing module 130 may then forward the recognized verbal command back to the media device 106 for processing.

Figure 2:
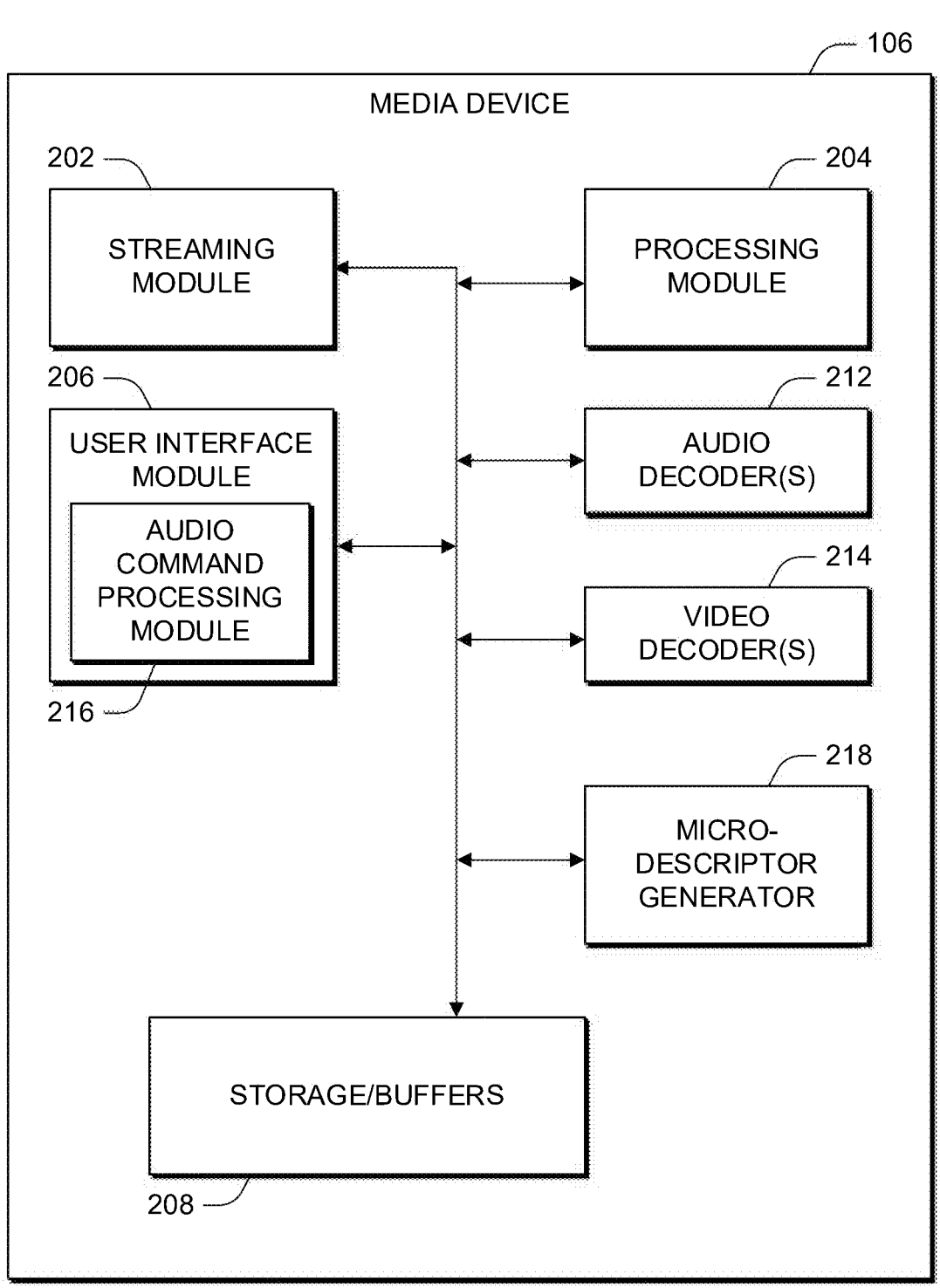
FIG. 2 illustrates a block diagram of a streaming media device, according to some embodiments.

In some embodiments, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

The system servers 126 may also include a content recommendation engine 132 that can include or implement one or more content recommendation algorithms and/or models. The media device 116 may include a user interface module 206 (see FIG. 2) configured to generate a user interface, such as a GUI presented on display device 108, which can be configured to present recommendations for content, such as content 122 from content server(s) 120. The recommendations can be generated by content recommendation engine 132 based, for example, on target user preferences, histories, behaviors, and/or demographics; content popularity rankings or change in popularity rankings over a time period across a segment or population of users (e.g., where the segment of users is one to which the target user belongs); and/or a promotion status or value associated with a content option, which may be used to promote content on a service implemented by multimedia environment 102. As an example, the generated recommendations can be transmitted from a system server 126 to a media device 106 and displayed via the user interface, e.g., on the display device 108, in the form of lists or tiled arrangements of images (or videos or animations) as may be sourced from metadata 124 and, in some examples, corresponding accompanying text (e.g., titles or other information) as may be sourced from metadata 124 or otherwise generated as described herein.

Content recommendations can also be based on content recommendation requests from a user. For example, a user may use microphone 112 or another input to request content recommendations that meet some parameter supplied in the recommendation request. The parameter can be related to any metadata 124, as examples, one or more of genre, creator/talent, and/or year. For example, a user may provide a request utterance such as "I'm in the mood for a horror movie" or "What '80s or '90s Tom Cruise romance movies do you have available?" Audio command processing module 130 or 216 may process the recommendation request utterance, and the processed recommendation request utterance can be provided to the content recommendation engine 132 to generate one or more recommendations satisfying the parameter(s) of the recommendation request(s). In some examples, recommendation engine 132 may call a generative AI 136, which can include a generative AI model, such as an LLM, to further process the recommendation request utterance to obtain information useful in making recommendations.

The system servers 126 may also include a micro-descriptor generator 134 configured to generate micro-descriptors corresponding to individual content options from content 122. In some examples, the micro-descriptors also correspond to (e.g., are customized for) a particular user 132 targeted with a content option recommendation, or a class of users, such as an audience segment (e.g., "true crime fans" or "North Americans ages 26-35"). Each micro-descriptor can be a concise description of a corresponding recommend content option. For example, a micro-descriptor can be generated to be no more than five words, or no more than five generative AI tokens. For example, a micro-descriptor can be generated to be no more than three words, or no more than three generative AI tokens. For example, a micro-descriptor can be generated to be exactly three words, or exactly three generative AI tokens. The linguistic tone of each micro-descriptor can be customized for the particular content domain of the corresponding recommended content option. As one example, where a recommended content option belongs to an entertainment content domain, in which the content includes movies and television series produced for entertainment purposes, a corresponding micro-descriptor can be a concise, appealing description of the corresponding recommend content option, formulated with the goal of engaging a user 132. As another example, where a recommended content option belongs to a news content domain, in which the content includes live or pre-recorded news broadcasts produced for objective informational purposes, a corresponding micro-descriptor can be a concise, objective description of the corresponding recommended content option, formulated with the goal of supplying a neutral, impartial, and dispassionate description to a user 132. The micro-descriptor generator can make calls to the generative AI 136, e.g., via a generative AI gateway (not shown) that can serve as a mediator between the micro-descriptor generator 134 and the generative AI 136, permitting a variety of different generative AI models to be substitutably used as the generative AI model 136. In some embodiments, not illustrated, the micro-descriptor generator 134 can be provided in the content server(s) 120, additionally or alternatively to being provided in the system server(s) 126.

In some embodiments, micro-descriptors generated by micro-descriptor generator 134 can be transmitted to a media device 106 via network 118 and incorporated into a GUI displayed using display device 108. In some embodiments, micro-descriptors can additionally or alternatively be generated by media device 106 using a micro-descriptor generator 218 within the media device 106 (see FIG. 2). The media device 106 may call on a remote generative AI model 126 (e.g., via a generative AI gateway) to generate the micro-descriptors, or may run a generative AI model locally, depending on the computational capability of the media device 106. The media device 106 and the system server(s) 126 may then, in some examples, cooperate to pick a micro-descriptor to use in the GUI for each recommended content option from among those generated by the system server 126 and the media device 106, or, in other examples, the media device 106 and the system server(s) 126 may establish beforehand which of them will be responsible for generating displayed micro-descriptors.

In some examples, the micro-descriptors can be generated on-the-fly, e.g., in substantially real time as a user navigates recommended content options in the GUI (e.g., using remote control 110), while in other examples, the micro-descriptors can be batch generated in advance of use of the GUI by the user 132, based on metadata 124 and other data, stored in a data store (e.g., in system server(s) 126, or as part of metadata 124 in content server(s) 120), and supplied to the media device 106 for incorporation in the GUI upon use by the user 132. Given adequate computational capability, media device 106 can generate each displayed micro-descriptor in substantially real time, as a recommended media content option is pre-selected or previewed. As the term "real time" is used herein, a micro-descriptor for a corresponding content option is generated and displayed in real time if it is generated and displayed within 250 milliseconds of a user 132 pre-selecting or previewing the corresponding content option. In still other examples, micro-descriptors can be generated on-the-fly as corresponding content options are loaded and displayed by the GUI.

The multimedia environment 102 can include a generative AI 136. Generative AI 136 can include or implement one or more generative AI models which can include, in some examples, an LLM, a small language model, a multi-modal model, or another type of generative AI model capable of processing data to produce concise textual micro-descriptors. A multi-model model, for example, may be able to generate outputs based not on textual inputs, or not solely on textual inputs, but by using visual inputs, such as images or videos, as an alternative to or in addition to textual inputs. The generative AI 136 can be run remotely from the media system 104, e.g., the generative AI 136 may be cloud-based. Examples of large language models include OpenAI GPT-4 and GPT-4O, Google Gemini, and Anthropic Claude. The generative AI 136 may be called by the system server 126, the media device 106, or the content server 120, e.g., via a generative AI gateway (not shown).

FIG. 2 illustrates a block diagram of an example media device 106, according to some embodiments. Media device 106 may include a streaming module 202, processing module 204, storage/buffers 208, and user interface module 206. As described above, the user interface module 206 may include the audio command processing module 216. The media device 106 may also include one or more audio decoders 212 and one or more video decoders 214. Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples. Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OPla, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples. As described above, in some embodiments, the media device 106 can further include a micro-descriptor generator 218. The micro-descriptor generator 218 can function as described above, and as described in further detail below, to generate micro-descriptors for corresponding recommended content options, which can be displayed in a GUI via user interface module 206.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to pre-select, preview, and/or select content, such as a movie, TV show, music, book, application, game, etc. Different aspects of the GUI produced by interface module 206 may alter displayed information for pre-selected or previewed content. For example, the GUI may display one or more micro-descriptors as part(s) of the GUI when a content option is pre-selected or previewed. The streaming module 202 of the media device 106 may request selected content from the content server(s) 120 over the network 118. The content server(s) 120 may transmit the requested content to the streaming module 202. The media device 106 may transmit the received content to the display device 108 for playback to the user 132.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

Example Content Service User Interface with Micro-Descriptors

Figure 3:
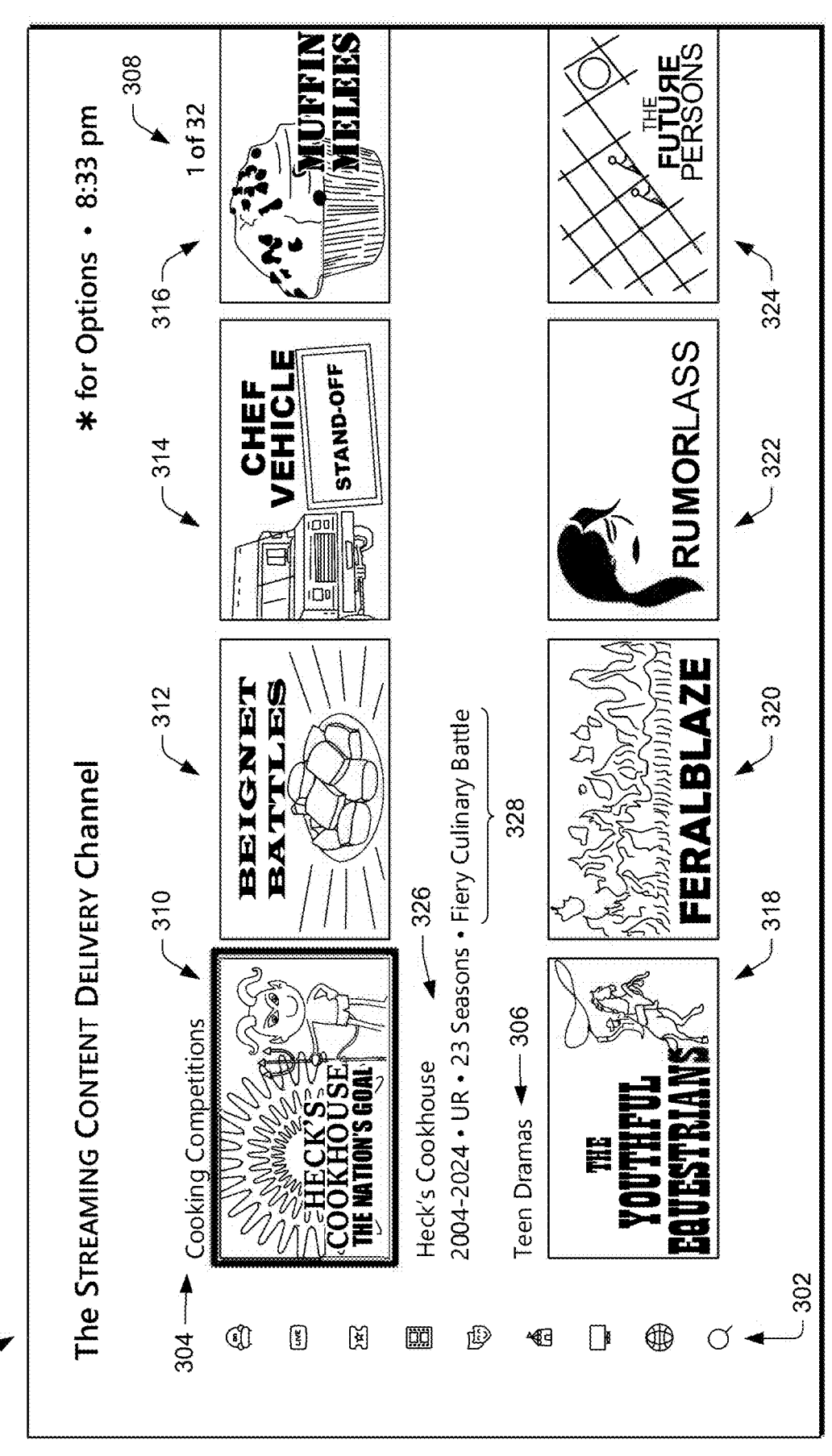

FIGS. 3 and 4 illustrate example screens 300, 400 from an example media content selection user interface, as may be generated, for example, by user interface module 206 and displayed by display device 108. Screen 300 of FIG. 3 is an example grid-BoB screen ("BoB" standing for "back of box") of the example GUI that presents a plurality of recommended media content options for pre-selection. The example GUI includes a menu bar 302 arranged vertically on the left-hand side of the screen 300, but other examples may provide a menu bar or other controls in other portions of the screen, e.g., along the top, the bottom, or the right-hand side. The menu bar 302 may be configured to collapse and/or become invisible to devote more screen space to the display of content options, in some examples. The example GUI presents recommended content options as categorized into different categories 304, 306 (a "cooking competitions" category 304 and a "teen dramas" category 306 in the illustrated example) arranged as rows of content options, but in other examples, the recommended content options may be arranged in different ways, including uncategorized. The category arrangement (or other arrangement) may also be presented in other ways in other examples, e.g., as vertical columns rather than as horizontal rows. A counter 308 may indicate a total number of content options in a current row. The current row may, for example, be a row in which a content option is pre-selected.

Each content option is represented in the example screen 300 by a thumbnail image. In the illustrated example, eight thumbnail images 310, 312, 314, 316, 318, 320, 322, 324 are shown, but other examples may have more or fewer thumbnail images, and, in some examples, more thumbnail images may be displayed, for example, by a user navigating right or down within the GUI. The thumbnail images may be still images, and/or may include animations and/or videos. For example, pre-selection of a thumbnail may activate an animation or video motion of the thumbnail. For example, a thumbnail video may include a trailer or portion of a trailer for a content option. A thumbnail video may be silent or may include and play accompanying audio.

A user may navigate the GUI (e.g., by pressing directional buttons of remote control 110) to move across the rows or up and down between rows of recommended content options or to move to or within the menu bar 302. Each navigational movement may have the effect of pre-selecting a content option or menu bar option. In the illustrated example, a first, upper-leftmost content option is pre-selected, resulting in a highlighted box being rendered around first thumbnail image 310. From the illustrated pre-selection, a rightward navigation may pre-select the second thumbnail 312 in the row corresponding to recommended category 304. From the illustrated pre-selection, a downward navigation may pre-select thumbnail 318 in the row corresponding to recommended category 306.

User pre-selection of a content option within screen 300 may alter the GUI display by showing summary information 326 pertaining to the pre-selected content option. In the illustrated example, summary information 326, pertaining to the pre-selected content option represented by thumbnail 310, includes a title of a TV series, a production year range, a content rating, and a number of seasons. Other examples may include other metadata beyond what is shown in example screen 300, such as audience rating, content rating, a content rating explanation, content warnings, runtime, or other information items.

In the illustrated example screen 300, the summary information 326 further includes an AI-generated micro-descriptor 328. By implementing display of micro-descriptor 328 in screen 300 of the GUI, a balance is struck between displaying too little or no descriptive information regarding a pre-selected content option and displaying too much information regarding the pre-selected content option. Displaying too little or no descriptive information about a pre-selected content option may leave a user underinformed regarding the content option or without any information correlative to the reasoning behind the recommendation of the content option, and/or underenticed to preview and/or select the content option. Displaying too much descriptive information about the content option (e.g., a full or truncated third-party-provided description) may consume screen area that would, for the sake of improved rapid assessment and navigation of options, be put to better use displaying content option thumbnails. A third-party-provided content description can be truncated (e.g., by use of a truncating ellipsis) to consume less screen area, but a truncated content description may be underinformative in that an aspect of the description critical to properly informing or enticing the user may be among the truncated portion.

Furthermore, for certain content options, other metadata displayed in the summary information 326 (aside from a description of the content option) may be so long and consume so much screen area so as to leave too little screen area left to populate with any kind of description longer than about three words. This may be the case more frequently when the GUI is rendered in a portrait aspect ratio (not shown) rather than a landscape aspect ratio (as shown). For example, the GUI may be rendered in a portrait aspect ratio when displayed on a mobile device such as a smartphone or tablet. Additionally, a user may prefer not to be shown plot summaries in a GUI, so as to avoid being spoiled with regard to plot developments in the content. Accordingly, a micro-descriptor 328 is advantageously displayed in screen 300 rather than a lengthier plot summary or other third-party-provided content description, enhancing user focus on a pre-selected content option without sacrificing user viewing of, and user navigability between, other recommended content options within the screen 300 of the GUI.

Within screen 300, a user choice of a pre-selected content option (e.g., by pressing an affirmation button of remote control 110) can, in some examples, select the pre-selected content option and start playing (e.g., start streaming) the selected content option (e.g., from content server 120 to media device 106 of media system 104). In some examples, however, the user choice of a pre-selected content option can lead to a preview screen wherein the user may be presented with a varying (e.g., greater) volume, variety, and/or density of information relating to the pre-selected content option.

Screen 400 of FIG. 4 shows an example content detail preview screen of the example content selection user interface. Information displayed in the example screen can be sourced from metadata 124 provided from content server 120, for example. Screen 400 displays a title 402 of the previewed content option, an image 404 (or animation, or video, or montage or collage of images) corresponding to the previewed content option, an audience rating 406, a year (or years) 408, a content rating 410, a runtime 412, a short list 414 of involved creators or talent, a truncated third-party-provided plot summary 416, and a genre 418. The truncated plot summary 416 can be expanded to a full plot summary, on the same screen or on a different screen, for example, by choosing an indicated control in the GUI or pressing an indicated button on the remote control 110 (an asterisk button, in the illustrated example). Screen 400 can further display an AI-generated micro-descriptor 428 that can serve as additional contextual information before the user activates consumption of the corresponding content by selecting the previewed content option, and/or enticement for the user to select the previewed content option. As described above, the AI-generated micro-descriptor 428 can further serve as a satisfying explanation of the reasoning behind the recommendation of the previewed content option by providing information correlative to the reasoning behind the recommendation of the content option. Integration of the micro-descriptor 428 in screen 400 thus serves as an improvement to the media content selection GUI even when a longer textual description or portion thereof (e.g., truncated plot summary 416) is also displayed.

Screen 400 can further include various buttons or controls 422 that can lead to other screens or content. The illustrated example includes a button to view a trailer, a button to save the previewed content option in a list for later viewing by the user, and a button to see still more options. Screen 400 can further include a display of viewing time remaining, in examples where a user previously began and prematurely ended viewing of the content. Screen 400 can further include a button 426 to select the content (e.g., to start or resume watching the content), which, in the illustrated example, is the highlighted and default choice.

Screen 400 can further include additional content recommendations, which can be presented as thumbnails 430, 432, 434, 436, and 438 in a way similar to that illustrated in screen 300. A user navigating down to the additional content recommendations to pre-select one of the additional content recommendations can activate display within the screen 400 of summary information similar to summary information 326 described above with regard to screen 300, which can include a corresponding additional micro-descriptor for each of the additional content recommendations. The additional content recommendations of screen 400 can be generated by the content recommendation engine 132, and can be additionally based on the user's previewing of the content option shown in the content detail preview of screen 400.

The example micro-descriptors 328 and 428 can be generated using a generative AI, such as generative AI 136 in FIG. 1, e.g., based on metadata 124 and/or information known to the generative AI because of its training. Example methods of micro-descriptor generation are described below with regard to FIGS. 5A and 5B and FIGS. 6A through 6C.

AI Generation of Micro-Descriptors

Figure 5B:
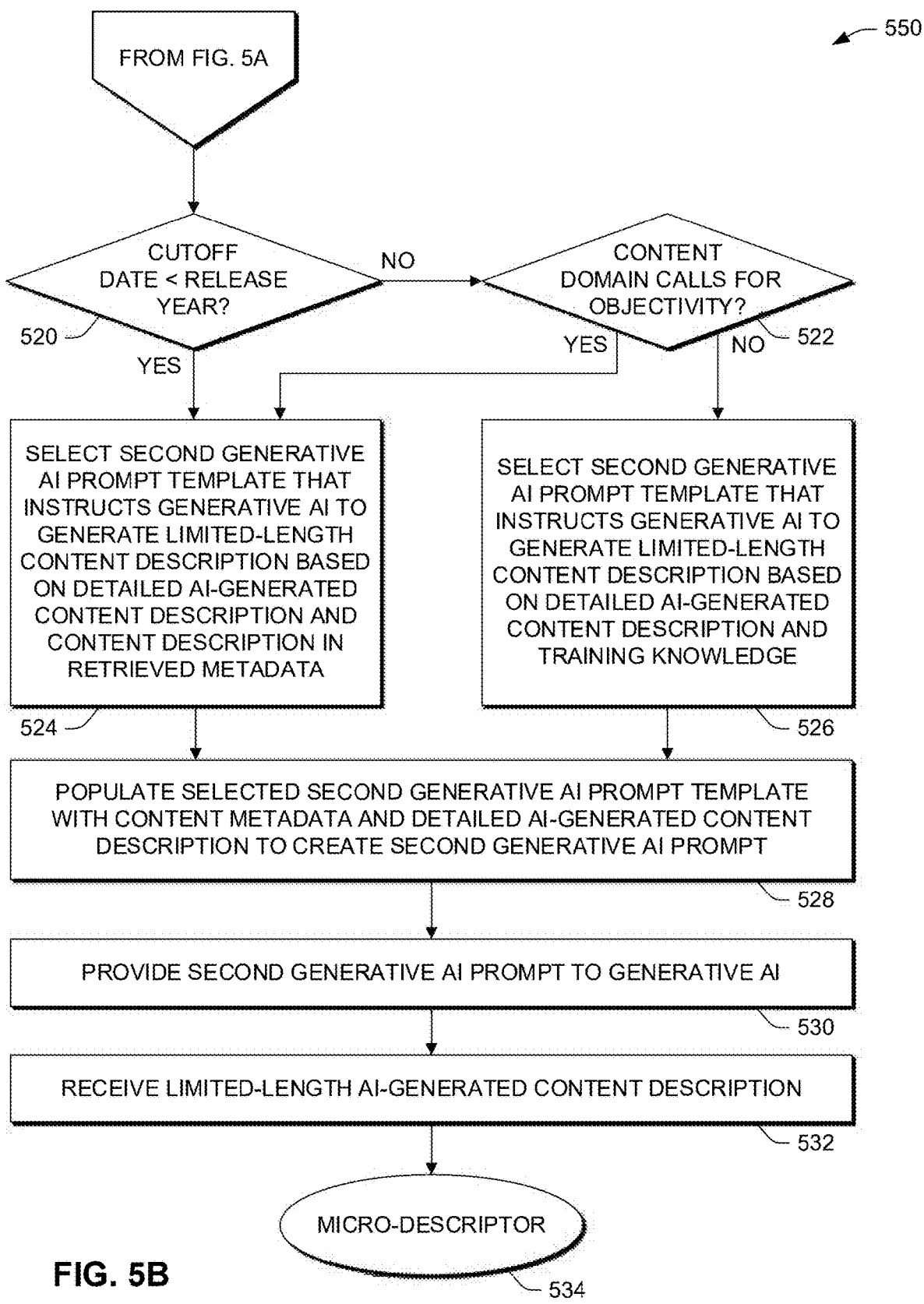

The flow diagram of FIGS. 5A and 5B illustrates one example method, beginning at 500 and continuing at 550, of using a generative AI, such as generative AI 136 in FIG. 1, to generate a micro-descriptor for a content option. Method 500, 550 can be performed by processing logic that can comprise hardware (e.g., circuitry, dedicated logic, programmable logic, microcode, etc.), software (e.g., instructions executing on a processing device), or a combination thereof. Not all steps may be needed to perform the disclosure provided herein. Further, some of the steps may be performed simultaneously, or in a different order than shown in FIGS. 5A and 5B. Method 500, 550 is described with reference to FIGS. 1 and 2. The method of FIGS. 5A and 5B can be performed, for example, by micro-descriptor generator 135 in one or more system servers 126, and/or by micro-descriptor generator 218 in media device 106. However, method 500, 550 is not limited to that example embodiment.

The method illustrated in FIGS. 5A and 5B can proceed in two phases. In a first phase, generally outlined in 500, a generative AI is used to generate a detailed description of the content option. In this phase, information about the content is, in effect, extracted from the training memory of the generative AI to use in the detailed description, unless circumstances indicate that this would be impracticable or inappropriate, e.g., for live events or newer content that the generative AI could not yet know about. In a second phase, generally outlined in 550, the generative AI is used to generate the desired micro-descriptor, in effect condensing the previously generated detailed description to a very concise (e.g., three-word) phrase.

In 502, the training cutoff date of the generative AI model (e.g., LLM) to be used in the method is determined. The training cutoff date can depend on the particular generative AI model used. For example, if a generative AI gateway is used to interface with the generative AI, then the generative AI gateway may be coded with, or store in a data store, the training cutoff dates of generative AI models that it is capable of interfacing with. The generative AI gateway may thus be capable of providing the generative AI training cutoff date for the particular generative AI model used. In other examples, the generative AI training cutoff date of a selected generative AI model can be hard-coded into the micro-descriptor generator 134 or 218 performing the method of FIGS. 5A and 5B. In still other examples, the generative AI training cutoff date can be retrieved by querying the generative AI. The generative AI may know of its own training cutoff date and may be able to supply the training cutoff date responsive to a query. In yet other examples, the training cutoff date can be received as a manual user input, e.g., during batch processing to generate micro-descriptors for a number of different content options that are stored for later use and display by a GUI that may be similar to the example screens 300 and 400 shown in FIGS. 3 and 4.

In 504, content metadata corresponding to a content option, including a release year or equivalent metadata (e.g., release date, or range of release years or release dates), is retrieved from a content server data store (e.g., metadata 124 of content server 120 in FIG. 1). The retrieved metadata can also include other information, such as a textual content description (e.g., plot summary), if available in the metadata. As described above, the textual content description may be one provided by a third party, such as a content distributor or data vendor, and may be several sentences long, e.g., three to four sentences long. Accordingly, the retrieved textual content description may be somewhat descriptive, but may not be rich in detail. As examples, the retrieved textual content description may not include substantial detail about different characters in a story of a movie or TV show, detail about the main storyline or theme, or detail about any significant development or twist of the plot.

In 506, it is determined whether the training cutoff date, as determined in 502, precedes the release year (or release date, or range of release years or release dates), as retrieved in 504. If so, then the generative AI cannot be expected to have knowledge of the content represented by the content option being processed, and special care should be taken in the method to avoid AI hallucinations from infecting the generative AI output and influencing the ultimately generated micro-descriptor.

In 508, it is determined whether the content domain of the content option being processed calls for the subsequently generated micro-descriptor to be objective (e.g., neutral, impartial, dispassionate), as opposed, for example, to being viewer-enticing. An example of a content domain not calling for objectivity in the micro-descriptor is (non-live) entertainment content, such as entertainment movies and entertainment TV series. Examples of content domains calling for objectivity in the micro-descriptor can include news content, live sports content, live feed content, and children's programming content. Whereas the entertainment content domain may not call for an objective micro-descriptor to be generated, the news content domain or the live sports content domain may call for objectivity in the generated micro-descriptor. Whereas an enticing micro-descriptor generated for a content option in the entertainment content domain may use salesy, pitch-like, fanciful, whimsical, figurative, or even hyperbolic terms or puffery to describe the content option with the objective of enticing a user to select the content option, an objective micro-descriptor generated for a content option in a news content domain or a live sports content domain may avoid such terms to maintain evenness of tone, the appearance of impartiality, dispassion, detachment, or emotional distance. In some examples, the determination made in 508 can be based on an objectivity flag in metadata retrieved in 504. In some examples, the determination made in 508 can be based on comparing a content domain value in the metadata retrieved in 504 with a list of domain values calling for objectivity (or, alternatively, with a list of domain values not calling for objectivity).

The determinations made in 506 and 508 can happen in any order. In other examples, these determinations can switch places with each other in the flow diagram of FIG. 5A.

In 510, based on the generative AI training cutoff date preceding the release year (or release date, or range of release years or release dates) or the content domain calling for objectivity (e.g., the content domain of the content option being news, live sports, live television feed, or children's programming), a first generative AI prompt template is selected that includes a natural language instruction configured to instruct the generative AI to generate a detailed content description based on a content description in the metadata retrieved in 504. Thus, in 510, training knowledge of the generative AI model of the generative AI with regard to the particular content for which the micro-descriptor is being generated is not relied upon to generate the detailed content description for the content. The a first generative AI prompt template, and the other generative AI prompt templates described below, can be programmatically selected from among a plurality of generative AI prompt templates stored in a data store. For example, the a first generative AI prompt template can be programmatically selected from among the plurality of generative AI prompt templates stored in the data store based on the selection logic that includes at least in part the determinations made in 506 and 508. The prompt template data store (not illustrated) can be part of micro-descriptor generator 134, for example.

Alternatively, in 512, based on the release year (or release date, or range of release years or release dates) preceding the generative AI training cutoff date and the content domain not calling for objectivity in the generated micro-descriptor, a first generative AI prompt template is selected that instructs the generative AI to generate a detailed content description based on training knowledge held by the generative AI model of the generative AI. Thus, in 512, training knowledge of the generative AI model of the generative AI with regard to the particular content for which the micro-descriptor is being generated is relied upon to generate the detailed content description for the content.

In either 510 or 512, a first generative AI prompt template is selected, but a different prompt template is selected in 510 than is selected in 512. The prompt template can include textual (e.g., natural-language) instructions and one or more placeholders for which values can be substituted during a population of the prompt template to create a first generative AI prompt. In either 510 or 512, the first generative AI prompt template includes instructions to generate a content description (e.g., plot summary) that is lengthier and more detailed than the generally several-sentence content description stored as part of metadata 124. In 512, for example, because the generative AI model may have been trained on entries from encyclopedias, review websites, blogs, social media posts, and other training corpus materials that may be descriptive of the content, the generative AI model can possess knowledge of the content beyond that which is stored in metadata 124. For example, in 512, the prompt template may include instructions asking the generative AI to include such elements in the detailed content description as a main storyline or theme and any significant development or twist of the plot. Accordingly, the generative AI may generate a richer description than that provided as part of metadata 124. Even in 510, where training knowledge of the generative AI pertaining specifically to the content is not relied upon to generate the detailed content description, training knowledge of the generative AI that is not specific to the content may inform the generation of the detailed content description.

In 514, the selected first generative AI prompt template is populated with content metadata to create a first generative AI prompt. The population includes substituting placeholders in the prompt template with information from the content metadata retrieved in 504. The metadata populated in the prompt template can include title, content type, and release year. The inclusion of content type and release year information can assist the generative AI in disambiguating between different content options having the same title, which can be of higher importance where the first generative AI prompt template is selected in 512 (as opposed to 510), and the generative AI draws on its trained memory of its training data for information about the content option when generating the detailed content description. In some examples, the populated metadata can include flag information indicating whether the content is children's programming. This flag information can help to ensure that age-appropriate language is used in generating the detailed description. In some examples, the populated metadata can include genre.

The population in 514 can, in some examples, also include insertion of other instructions into the first generative AI prompt. For example, instructions as to the tone of the output can be inserted. For example, based on the content domain of the content option calling for objectivity, as described above with reference to 508, an instruction to maintain an unbiased, dispassionate tone in the detailed content description can be inserted into the first generative AI prompt. On the other hand, based on the content domain of the content option not calling for objectivity, an instruction to use a tone that is one or more of salesy, pitch-like, fanciful, whimsical, passionate, hyperbolic, etc., in the detailed content description can be inserted into the first generative AI prompt.

In 516, the first generative AI prompt can be provided to a generative AI. For example, the system server 126 or media device 106 can transmit the first generative AI prompt to an external generative AI, such as generative AI 136 in FIG. 1 via network 118 (e.g., over the internet). In other examples (not illustrated), the generative AI may be provided locally within the system server 126 or the media device 106, meaning that external transmission of the first generative AI prompt need not be performed. In 518, an AI-generated detailed content description can be received from the generative AI in response to the providing the first generative AI prompt in 516. The AI-generated detailed content description received at 518 can be provided, for example, as a single paragraph of natural language prose. In some examples, the AI-generated detailed content description received at 518 is between about one-hundred words and about five-hundred words long, e.g., between about one-hundred words and about three-hundred words long, e.g., between about one-hundred words and about two-hundred words long.

Method 500 of FIG. 5A can continue as 550 of FIG. 5B. In 520, it can be determined whether the training cutoff date precedes the release year (or release date, or range of release years or release dates). In 522, it can determined whether the content domain of the content option being processed calls for the subsequently generated micro-descriptor to be objective. The determinations made in 506 and 508 can be re-used for these purposes, respectively, and 520 and 522 can be performed in either order.

In 524, based on the generative AI training cutoff date preceding the release year (or release date, or range of release years or release dates) or the content domain calling for objectivity, a second generative AI prompt template is selected that instructs the generative AI to generate a limited-length content description based on the detailed AI-generated content description received in 518 and based on the content description in the metadata retrieved in 504.

Alternatively, in 526, based on the release year (or release date, or range of release years or release dates) preceding the generative AI training cutoff date and the content domain not calling for objectivity in the generated micro-descriptor, a second generative AI prompt template is selected that instructs the generative AI to generate a limited-length content description based on the detailed AI-generated content description received in 518 and based on the training knowledge held by the generative AI model of the generative AI.

In either 524 or 526, a second generative AI prompt template is selected, but a different prompt template is selected in 524 than is selected in 526. In either 524 or 526, the second generative AI prompt template includes an instruction to generate a content description that is length-limited. The length limit of the limited-length content description can be specified in the instruction in terms of words or generative AI tokens. For example, the second generative AI prompt template can include an instruction to generate a content description that is no more than five generative AI tokens in length. For example, the second generative AI prompt template can include an instruction to generate a content description that is no more than three generative AI tokens in length. For example, the second generative AI prompt template can include an instruction to generate a content description that is exactly three generative AI tokens in length. In other examples, the second generative AI prompt template can include an instruction to generate a content description that is no more than a certain number of words in length, e.g., five or three. For example, the second generative AI prompt template can include an instruction to generate a content description that is exactly three words in length.

In 528, the selected second generative AI prompt template is populated with content metadata and the detailed AI-generated content description received in 518 to create a second generative AI prompt. As described above, instructions as to the tone of the output can be inserted as part of the population, which instruction can be based on variables indicating whether or not an objective or dispassionate tone should be used.

In 530, the second generative AI prompt can be provided to a generative AI. In 532, a limited-length AI-generated content description can be received from the generative AI in response to the providing the second generative AI prompt in 530. This limited-length AI-generated content description can be provided as the micro-descriptor 534 for the content option.

The method of FIGS. 5A and 5B can be iteratively repeated, and/or performed in parallel, for multiple content options, to generate micro-descriptors for a plurality of (e.g., all) available content options. For example, a plurality of content options can be processed to generate respective micro-descriptors for each in a batch processing. The generated micro-descriptors can be stored in a data store, e.g., in system server(s) 126 and/or in content server(s) 120, and later retrieved for use in the GUI, as described above with regard to FIGS. 3 and 4. In some examples, multiple micro-descriptors are generated for each content option. As one example, for a given content option, a micro-descriptor can be generated for each audience segment, where an audience segment represents a plurality of users of the content service that is a subset of all of the users of the content service. Audience segments can be generated by segmentation clustering, e.g., based on usage histories or demographics of the users 132 or other information. As another example, for a given content option, a micro-descriptor can be generated for each user 132. In still other examples, multiple different micro-descriptors can be generated for each user 132 or each audience segment, and these different micro-descriptors can be rotated for display in the GUI, so that a user 132 does not necessarily view the same micro-descriptor every time the user 132 is recommended the corresponding content option. In yet other examples, the method of FIGS. 5A and 5B can be iteratively repeated to refresh micro-descriptors on an ongoing basis, so that a user 132 does not necessarily view the same micro-descriptor each time the user 132 is recommended the corresponding content option.

In other examples, the method of FIGS. 5A and 5B can be performed in real time as a user 132 interacts with the GUI. For example, each time a user pre-selects or previews a content option within the GUI, as described above with regard to FIGS. 3 and 4, the micro-descriptor generator 134 or 218 performs the method of FIGS. 5A and 5B to generate a corresponding micro-descriptor on the fly, and the generated micro-descriptor is displayed in the GUI upon its generation. Such a real-time micro-descriptor generation implementation may be advantageous in embodiments in which the descriptor generator 134 or 218 is implemented in hardware capable of running the generative AI locally, so that latency in GUI navigation and micro-descriptor display is reduced as compared to real-time generation embodiments that may rely on a remote (e.g., cloud-based) generative AI.

In embodiments in which micro-descriptors are generated on a per-user or per-audience-segment basis, as described above, user or audience segment information can be incorporated into the generative AI prompt that generates the detailed description (as provided, e.g., in 516), the micro-descriptor (as provided, e.g., in 530), or both. The incorporation of personalized or quasi-personalized information into the AI generation process can result in micro-descriptors that are customized to individual target users or target audience segments. As one example, the age of the user or an age range of a user's audience segment can be provided in the generative AI prompt(s), and, based on this provision, the generative AI can utilize slang or trendy buzzwords or catchphrases appropriate to the user's age in the generated micro-descriptors. As another example, information about a language (e.g., other than English) known to be understood by the user or audience segment can be provided in the prompt, and the generative AI can accordingly utilize words from this language in the generated micro-descriptors.

As another example, AI generation of content recommendation micro-descriptors can be based on trend information, either collected internally within the content service or from social media. The trend information can be provided in the prompt and used to generate the micro-descriptor. For example, if it is observed that a particular word or phrase is trending in the social media usage, that word or phrase can be provided to the generative AI in the prompt as a suggestion for potential incorporation into the micro-descriptor, and accordingly can be incorporated with greater frequency into micro-descriptors, where deemed appropriate by the generative AI. Trendiness in micro-descriptors can help foster user familiarity and drive user engagement. Accordingly, the automatic incorporation of trends into micro-descriptor generation can provide another improvement to media content selection user interface technology.

Figure 6A:
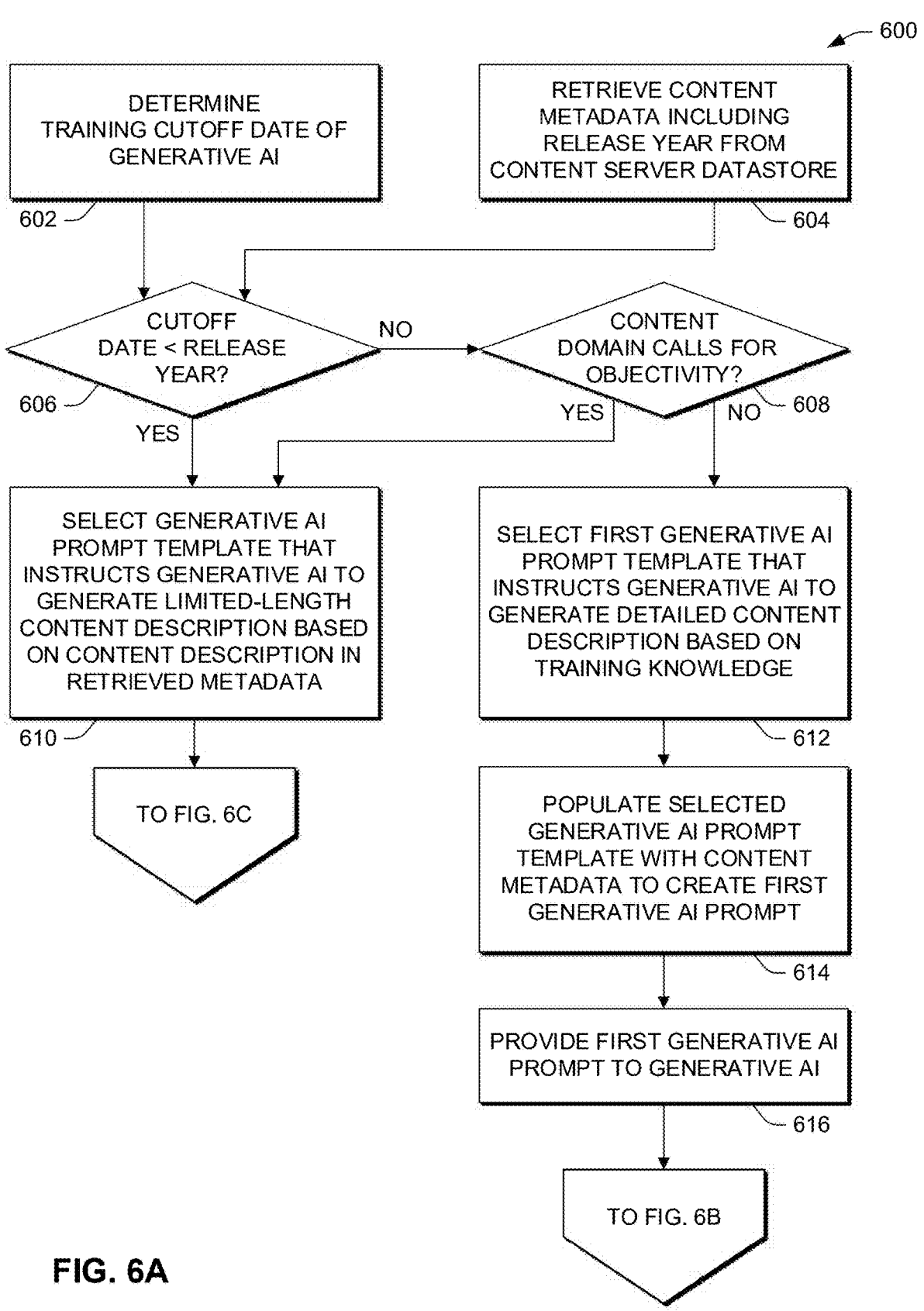
Figure 6B:
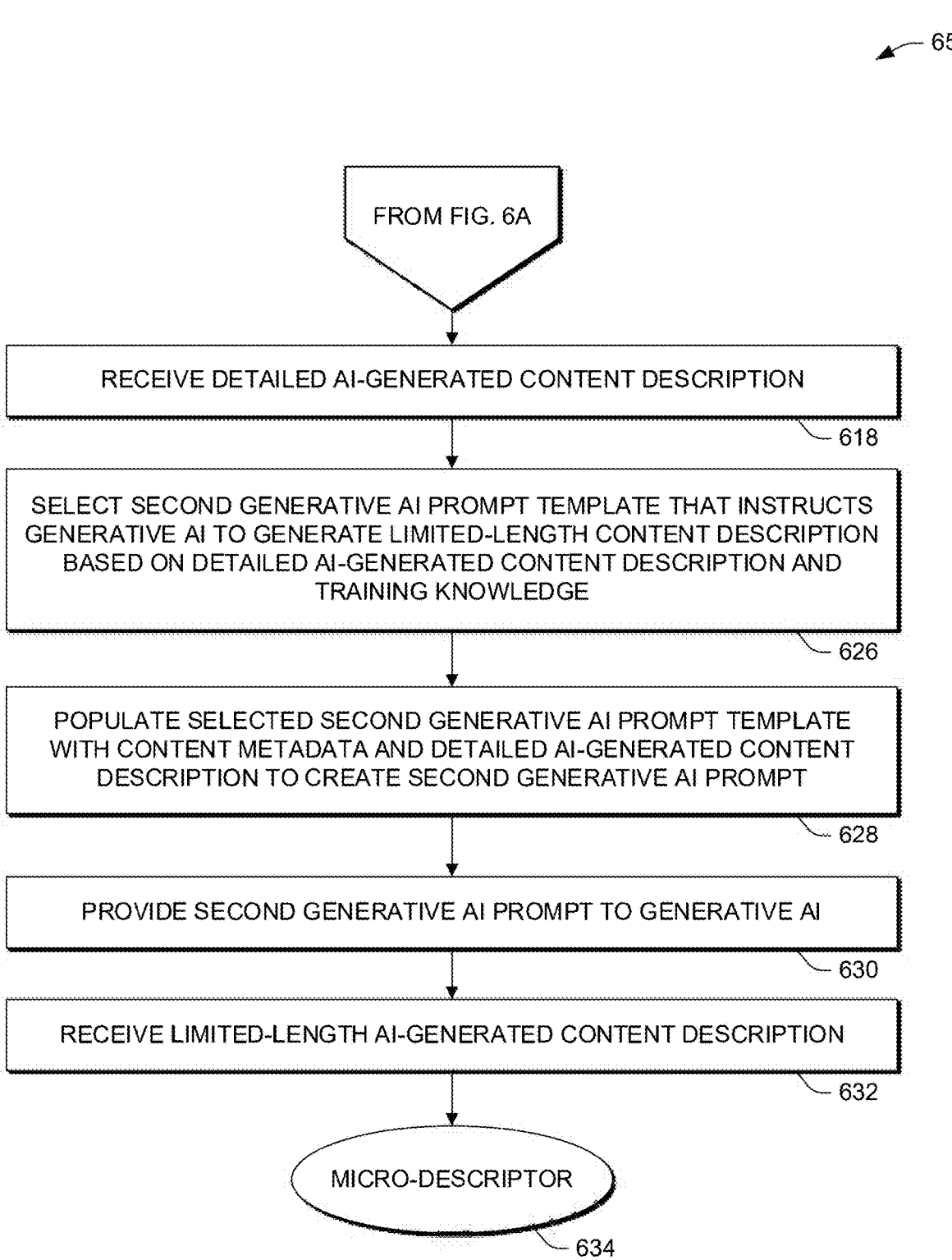

The flow diagram of FIGS. 6A through 6C illustrates another example method, beginning at 600 and continuing at 650 or 670, of using a generative AI, such as generative AI 136 in FIG. 1, to generate a micro-descriptor for a content option. The method of FIGS. 6A through 6C is similar to the method of FIGS. 5A and 5B, and similar aspects of the methods can function similarly, as described above. Accordingly, not all aspects of the method of FIGS. 6A through 6C are described in detail, but rather, the differences from the method of FIGS. 5A and 5B are particularly pointed out in the below description. The method can be performed by processing logic that can comprise hardware, software, or a combination thereof, and not all steps may be needed to perform the disclosure provided herein. Some of the steps may be performed simultaneously or in a different order than shown.

In 602, the training cutoff date of the generative AI model is determined. In 604, content metadata corresponding to a content option, including a release year or equivalent metadata, is retrieved from a content server data store. In 606, it is determined whether the training cutoff date precedes the release year (or release date, or range of release years or release dates). In 608, it is determined whether the content domain of the content option being processed calls for the subsequently generated micro-descriptor to be objective. The determinations made in 506 and 508 can happen in any order.

In 610, based on the generative AI training cutoff date preceding the release year (or release date, or range of release years or release dates) or the content domain calling for objectivity, a generative AI prompt template is selected that instructs the generative AI to generate a limited-length content description based on a content description in the metadata retrieved in 604. This differs from 510, in which a prompt template is selected to first generate a detailed description even though the training knowledge of the generative AI will not be relied upon. Here, in 610, a prompt template is selected with the aim of generating the micro-descriptor directly, based on the already available content description metadata, without the generative AI first generating a detailed description on which to base the micro-descriptor. This method is continued in 670 as shown in FIG. 6C.

Alternatively, in 612, based on the release year (or release date, or range of release years or release dates) preceding the generative AI training cutoff date and the content domain not calling for objectivity in the generated micro-descriptor, a first generative AI prompt template is selected that instructs the generative AI to generate a detailed content description based on training knowledge held by the generative AI model of the generative AI. Then, in 614, the selected first generative AI prompt template is populated with content metadata to create a first generative AI prompt, and in 616, the first generative AI prompt is provided to the generative AI. This method is continued in 650 as shown in FIG. 6B.

In 618, as shown in FIG. 6B, an AI-generated detailed content description can be received from the generative AI in response to the providing the first generative AI prompt in 616. The second phase of the method, in which the micro-descriptor is generated, then proceeds. In 626, based on the release year (or release date, or range of release years or release dates) preceding the generative AI training cutoff date and the content domain not calling for objectivity in the generated micro-descriptor, a second generative AI prompt template is selected that instructs the generative AI to generate a limited-length content description based on the AI-generated detailed content description received in 618 and based on the training knowledge held by the generative AI model of the generative AI. In either 610 or 626, a micro-descriptor-generating generative AI prompt template is selected, but a different prompt template can be selected in 610 than is selected in 626. The AI-generated detailed content description received at 618 can be provided, for example, as a single paragraph of natural language prose. In some examples, the AI-generated detailed content description received at 618 is between about one-hundred words and about three-hundred words long, e.g., between about one-hundred words and about two-hundred words long.

In 628, the selected second generative AI prompt template is populated with content metadata and the detailed AI-generated content description received in 618 to create a second generative AI prompt. In 630, the second generative AI prompt can be provided to a generative AI. In 632, a limited-length AI-generated content description can be received from the generative AI in response to the providing the second generative AI prompt in 630. This limited-length AI-generated content description can be provided as the micro-descriptor 634 for the content option.

Based, however, on the generative AI training cutoff date preceding the release year (or release date, or range of release years or release dates) or the content domain calling for objectivity, the method can continue from 610 in FIG. 6A with 670 as shown in FIG. 6C. In 636, the selected generative AI prompt template is populated with content metadata to create a generative AI prompt, and in 638, the generative AI prompt is provided to the generative AI. In 640, a limited-length AI-generated content description is received from the generative AI in response to the providing the generative AI prompt in 640. This limited-length AI-generated content description can be provided as the micro-descriptor 642 for the content option.

The method of FIGS. 6A through 6C can be iteratively repeated, and/or performed in parallel, for multiple content options, to generate micro-descriptors for a plurality of (e.g., all) available content options. Micro-descriptors can be batch-processed and stored, as described above, or can be generated in real time as a user interacts with a GUI, also as described above. Content descriptors can be continually refreshed, as described above. Content descriptors can be generated on a per-content option, per-audience segment, or per-user basis.

The illustrated methods as described above can advantageously make use of a chain of prompts to sequentially query the generative AI and reduce the risk of hallucination or other AI errors infecting the process. Although not illustrated, in some examples, each generative AI result can be followed by a simple evaluation to verify that the generative AI query completed successfully before moving on in the method. As one example, after receiving the detailed AI-generated content description in 518 of FIG. 5A, a word count can be made of the detailed AI generated content description to ensure that it is long enough (e.g., greater than 150 words). If it is not, the first prompt can be re-provided to the generative AI, with or without first re-creating the first prompt, to re-generate the detailed content description. As another example, after receiving the limited-length AI-generated content description in 532 of FIG. 5B, a word count can be made of the limited length AI generated content description to ensure that it is short enough (e.g., five words or fewer, or exactly three words). If it is not, the second prompt can be re-provided to the generative AI, with or without first re-creating the second prompt, to re-generate the detailed content description.

Larger or smaller chains of prompts can be implemented. For example, in other embodiments, not illustrated, a single prompt can be used that can call for multiple steps to be undertaken within the generative AI, such as both the metadata extraction step that generates the detailed description from information known to the generative AI from its training, and the summarization step that generates the micro-descriptor based on the detailed description. In still other embodiments, not illustrated, a larger of chain of prompts can be used to develop the micro-descriptor, with one or more other prompts accounting for user histories, preferences, behaviors, and demographics in the process before a summarization prompt generates the final micro-descriptor.

Automated Improvement of Micro-Descriptors for Enhanced User Interaction

Figure 7:
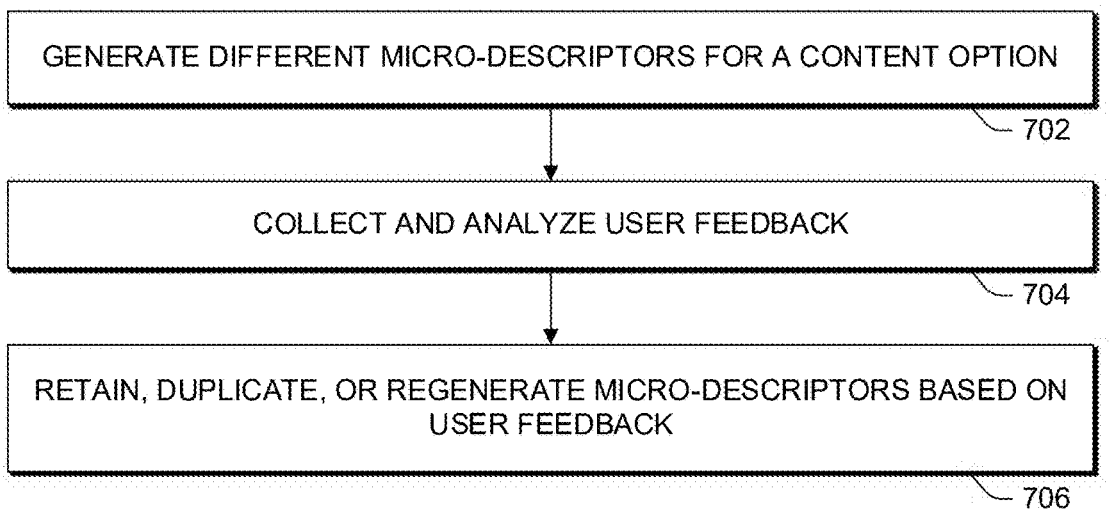
FIG. 7 illustrates an example method of automated A/B testing to choose AI-generated content recommendation micro-descriptors that result in improved positive user feedback.

FIG. 7 illustrates an example method 700 for automated A/B testing to choose AI-generated content recommendation micro-descriptors that result in improved positive user feedback (e.g., more previews or selections of content options). Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art. Method 700 can be implemented in multimedia environment 102 in the context of a content service, such as a streaming content service.

In 702, different micro-descriptors are generated for a content option. The different micro-descriptors can be generated, for example, by either of micro-descriptor generator 134 or micro-descriptor generator 218, as described above, e.g., with regard to FIGS. 5A through 6C. The system server(s) 126 can present the generated micro-descriptors to users. The different micro-descriptors can be presented to different users, and/or to a same user at different times, e.g., using a GUI like that illustrated in FIGS. 3 and 4. Some presentations of a micro-descriptor for a given content option may result in positive user feedback, e.g., the user will preview and/or select the content associated with the micro-descriptor, while other presentations of the same micro-descriptor may not.

In 704, data relating to the user feedback, positive or negative, is collected and analyzed to determine the relative strengths of different micro-descriptors. For example, system server(s) 126 can collect and analyze the user feedback from a plurality of media devices 106. As an example of the analysis, statistical methods can be used to determine how a given micro-descriptor ranks against one or more competing micro-descriptors for the same content option or for a similar content option. It may be found, for example, based on this A/B testing, that one micro-descriptor is super over others in promoting positive user feedback. For example, system server 126 can be configured to make determinations about the relative strengths of some generated micro-descriptors over others based on the analysis.

In 706, micro-descriptors can be retained, duplicated (e.g., to other users or to other similar content items), or discarded and regenerated based on the collected and analyzed user feedback. For example, a micro-descriptor found to be superior may be deemed to be working well to promote user engagement with a content option, and thus may be automatically retained and/or duplicated, in the latter case so that it is displayed to other users for the same content option or for other similar content options. As another example, a micro-descriptor deemed to be working poorly to promote user engagement with the corresponding content option may be automatically discarded, and a new micro-descriptor can be generated for the content option, e.g., using any of the methods described above with regard to FIGS. 5A through 6C. For example, system server 126 can be configured to make determinations about the relative strengths of some generated micro-descriptors over others based on the analysis. Accordingly, in some embodiments, each of steps 702, 704, and 706 can be carried out by a single entity, e.g., entirely server-side.

Figure 8:
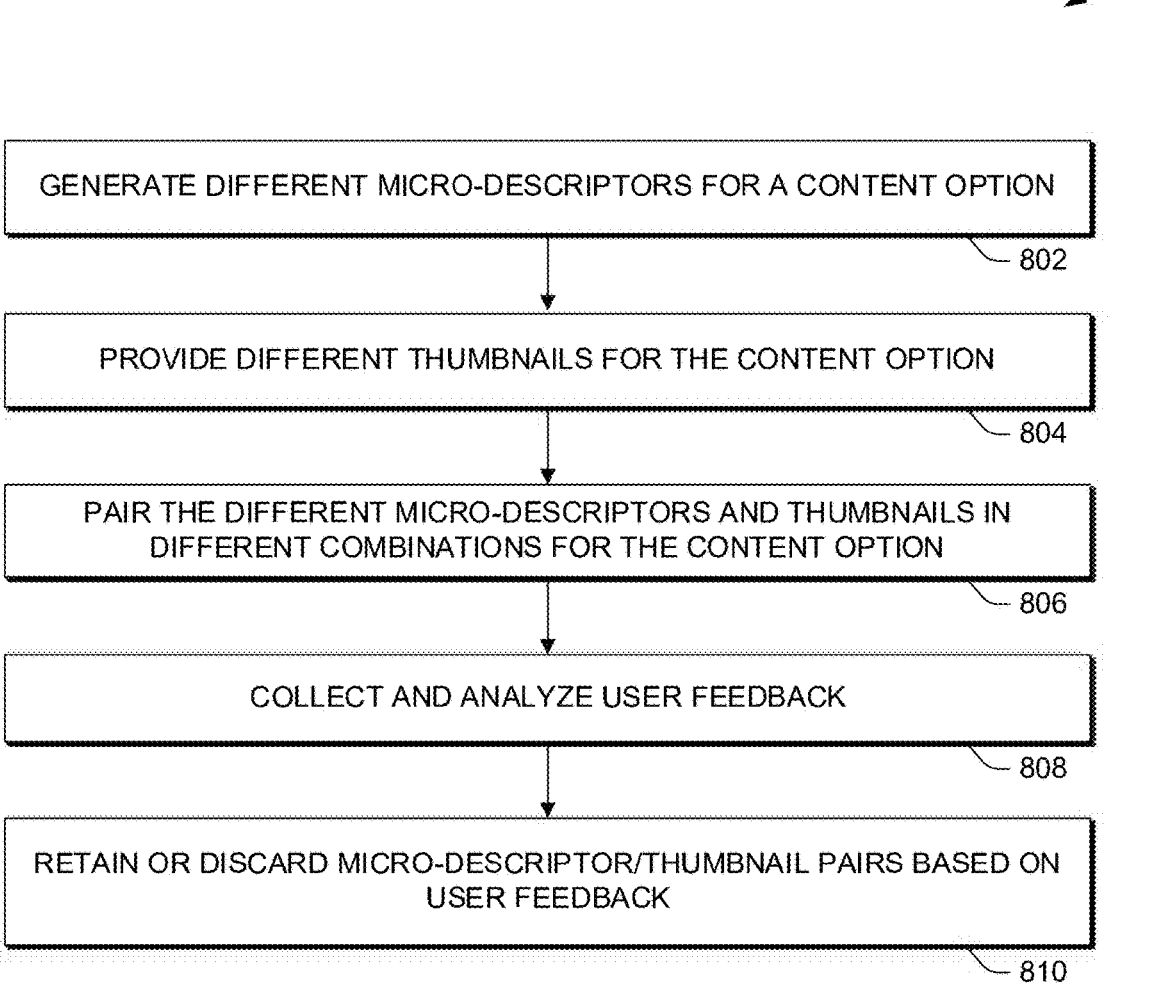
FIG. 8 illustrates an example method of automated A/B testing to choose pairs of micro-descriptors and content option thumbnails that result in improved positive user feedback.

FIG. 8 illustrates an example method 800 for automated A/B testing to choose pairings of AI-generated content recommendation micro-descriptors and thumbnail artwork for content options that result in improved positive user feedback (e.g., more previews or selections of content options). Method 800 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 8, as will be understood by a person of ordinary skill in the art. Method 800 can be implemented in multimedia environment 102 in the context of a content service, such as a streaming content service.

In 802, different micro-descriptors are generated for a content option. The different micro-descriptors can be generated, for example, by either of micro-descriptor generator 134 or micro-descriptor generator 218, as described above, e.g., with regard to FIGS. 5A through 6C. The system server(s) 126 can present the generated micro-descriptors to users.

In 804, different thumbnails are provided for the content option. For example, the different thumbnails can be uploaded to content server(s) 120 and/or system server(s), can be associated with corresponding content options, and can be downloaded to media devices 106 upon a user being presented with content option recommendations in a GUI. In some examples, the thumbnails can be generated by human artists. In some examples, thumbnails can be automatically AI-generated using generative AI 136 based, for example, on the content. For example, a system server 126 can be configured to automatically call generative AI 136 to automatically generate the different thumbnails. As described above, the thumbnails can be still images, animated still images, or videos.

In 806, the different micro-descriptors and the different thumbnails are paired in different combinations for the content option. For example, the system server(s) 126 can be configured to pair thumbnails with micro-descriptors, e.g., in accordance with a combinatorial optimization method, such as the Hungarian method. The system server(s) 126 can present the generated micro-descriptors to users. The different micro-descriptor/thumbnail pairs can be presented to different users, and/or to a same user at different times, e.g., using a GUI like that illustrated in FIGS. 3 and 4. Some presentations of a micro-descriptor/thumbnail pair for a given content option may result in positive user feedback, e.g., wherein the user previews and/or selects the content associated with the micro-descriptor/thumbnail pair, while other presentations of the same micro-descriptor/thumbnail pair may not.

In 808, data relating to the user feedback, positive or negative, is collected and analyzed to determine the relative strengths of different micro-descriptor/thumbnail pairs. For example, system server(s) 126 can collect and analyze the user feedback from a plurality of media devices 106. As an example of the analysis, statistical methods can be used to determine how a given micro-descriptor/thumbnail pair ranks against one or more competing micro-descriptor/thumbnail pairs for the same content option or for a similar content option. It may be found, for example, based on this A/B testing, that one micro-descriptor/thumbnail pair is superior over others in promoting positive user feedback. For example, system server 126 can be configured to make determinations about the relative strengths of some micro-descriptor/thumbnail pairs over others based on the analysis.

In 810, micro-descriptor/thumbnail pairs can be retained, duplicated (e.g., to other users), or discarded and regenerated based on the collected and analyzed user feedback. For example, a micro-descriptor/thumbnail pair found to be superior may be deemed to be working well to promote user engagement with a content option, and thus may be automatically retained and/or duplicated, in the latter case so that the pair is displayed to other users for the same content option. As another example, a micro-descriptor/thumbnail pair deemed to be working poorly to promote user engagement with the corresponding content option may be discarded, and a new micro-descriptor/thumbnail pair can be generated for the content option. For example a new pairing of an already-generated micro-descriptor and an already-provided thumbnail can be established for the content item and rotated into the A/B testing, or one or both of the micro-descriptor and/or the thumbnail can be automatically regenerated, e.g., using any of the methods described above. For example, system server 126 can be configured to make determinations about the relative strengths of some generated micro-descriptor/thumbnail pairs over others based on the analysis. Accordingly, in some embodiments, each of steps 802, 804, 806, 808 and 810 can be carried out by a single entity, e.g., entirely server-side.

Micro-Descriptor-Based Recommendations and Search

As described above, content recommendations can be generated using complex machine-learning models and/or other complex algorithms of content recommendation engine 132. These models and/or algorithms may be trained on not only on data related to user preferences, histories, behaviors, and demographics, or those of audience segments, but may also be trained on content-related metadata, e.g., metadata 124. AI-generated content recommendation micro-descriptors can be saved and stored as metadata (e.g., among metadata 124). The stored micro-descriptors can subsequently be provided back to the content recommendation engine 132 for training of the associated content recommendation model(s)/algorithm(s). The stored micro-descriptors may also subsequently be used to perform classification and thereby generate rows of recommended content as may be displayed in a GUI like that of FIGS. 3 and 4. Micro-descriptors may already be based on content recommendations inasmuch as the content recommendations inform the display of micro-descriptors and hence can influence A/B testing and associated automatic survival, demise, and revision of the micro-descriptors. Accordingly, when micro-descriptors are also used for training and classification of the content recommendation engine 132, recommendations and micro-descriptors can inform generation of each other in a feedback loop. This feedback loop can, over iterations, automatically evolve both recommendation and micro-descriptor aspects of the media content selection GUI, providing a further improvement to the media content selection GUI technology.

Furthermore, AI-generated content recommendation micro-descriptors saved as metadata can be made searchable within the GUI. Accordingly, a user who may remember a content option by its displayed micro-descriptor, even if not by its title, may search the GUI on the text of the micro-descriptor to find the content option. Permitting users to search on the AI-generated content recommendation micro-descriptors provides another improvement to the technology of media content selection user interfaces.

Implicit User Profiling

Multimedia environment 102 can be configured to provide explicit or implicit user profiling. Preferences, behaviors, histories, and demographics of a user can be associated with a user profile, permitting the environment 102 to understand which user is using a media system 104 to consume content, and to customize the experience based on the user profile. Customizations can include, as examples, providing customized video or audio display settings in accordance with preferences of the user, providing menu display settings customized to the preferences of the user, and/or basing content recommendations on the preferences, behaviors, histories, and/or demographics of the user. A single media system 104 or media system login account can have multiple user profiles associated with it, permitting different members of a household to have their preferences, behaviors, histories, and/or demographics tracked separately.

In explicit user profiling, a user of a media system 104 creates, or consents to automatic creation of, a user profile for the user. The explicitly created user profile may be visible to the user of the media system, e.g., within a content selection menu system. For example, the explicitly created user profile may be indicated within the content selection menu system by a thumbnail image of an avatar for the user, which may be automatically selected or customized as a default avatar, one of a library of avatars, a customizable avatar, a profile picture taken from a social media network or login authorizer used by the user, or a user-provided picture. As another example, the explicitly created user profile may be indicated within the content selection menu system by a name for the user, which can be created or provided by the user, or sourced from a social media network or login authorizer used by the user. Members of a household may create different explicit user profiles and may switch between them using the menu system as a way of informing the media system 104 which user is using the media system 104 at any given time. Content recommendations may be based on the currently set user profile and thereby customized to the particular user using the media system 104 at the given time.

Explicit user profiles may have drawbacks, however. As one example, a user may not appreciate the inconvenience and/or the perception of privacy intrusion associated with having to set up or modify an explicit profile, and with manually switching user profiles. Users may therefore fail to set up and/or switch explicit profiles. As another example, use of a media system 104 by a first user under a user profile of a second user may inadvertently conflate the preferences, behaviors, histories, and/or demographics of the first user with that of the second user, when the first user's usage is understood by the media system 104 to be the usage of the second user whose user profile is the currently set user profile during the first user's usage. This conflation may occur when the first user forgets to reset the user profile to a user profile of the first user after use of the media system 104 by the second user, or when the first user declines to create a user profile separate from that of the second user. Accordingly, media system 104 may advantageously make use of inferred user profiles (alternatively or additionally to the use of explicit user profiles), and recommendations may be based on the inferred user profiles.

In implicit user profiling, the media system 104 may infer a user of the media system 104 based on one or more inputs to the media system 104 and may automatically create or switch to a user profile for the inferred user. Collected data relating to preferences, behaviors, histories, and demographics of the inferred user can then be automatically associated with the inferred user profile, without requiring any user to manually switch to an explicit user profile for the user. In some examples, implicit user profiling can be visible to the user, as indicated, for example, by a switch in an avatar or name visible within the menu system of the media system 104, or in any of the ways that an explicit user profile would be indicated to a user using the media system 104. In other examples, implicit user profiling can be made entirely invisible to users of the media system 104, with user profiles being seamlessly created and switched between by the media system 104 without any indication to the users. With implicit user profiling, the multimedia environment 102 can understand which user is using a media system 104 to consume content, and may thereby customize the experience based on the implicit user profile without any active manual input from the user to create or switch user profiles.

Inferred user profile creation or switching can be based on any of a variety of data inputs to the media system 104 and/or multimedia environment 102, or a combination of such inputs. The data inputs can include, as examples, remote control usage data, mobile device data (from device(s) connected to the Wi-Fi or geolocation information reported from the device(s)), histories of selected or consumed content, camera input, and/or microphone input.

Data from remote control usage can be used to infer a user 132 and to switch to a user profile for the user 132, or to create a new user profile for the user 132 if none exists yet. The remote control usage data can be input pattern data (e.g., button pattern data) or remote control holding data, as examples. Different users may be identified by the different ways that they provide control inputs to the remote control 110, such as pressing buttons of the remote control 110. For example, different users may press buttons on the remote control with different amounts of fluency or dexterity, which can be recognizable as patterns in button pressing speed or command choice. A remote control 110 and/or media system 104 can be configured to collect and statistically analyze remote control input pattern data, and to profile the input pattern data in ways that can distinguish (or aid in distinguishing) one user from another.

Figure 9:
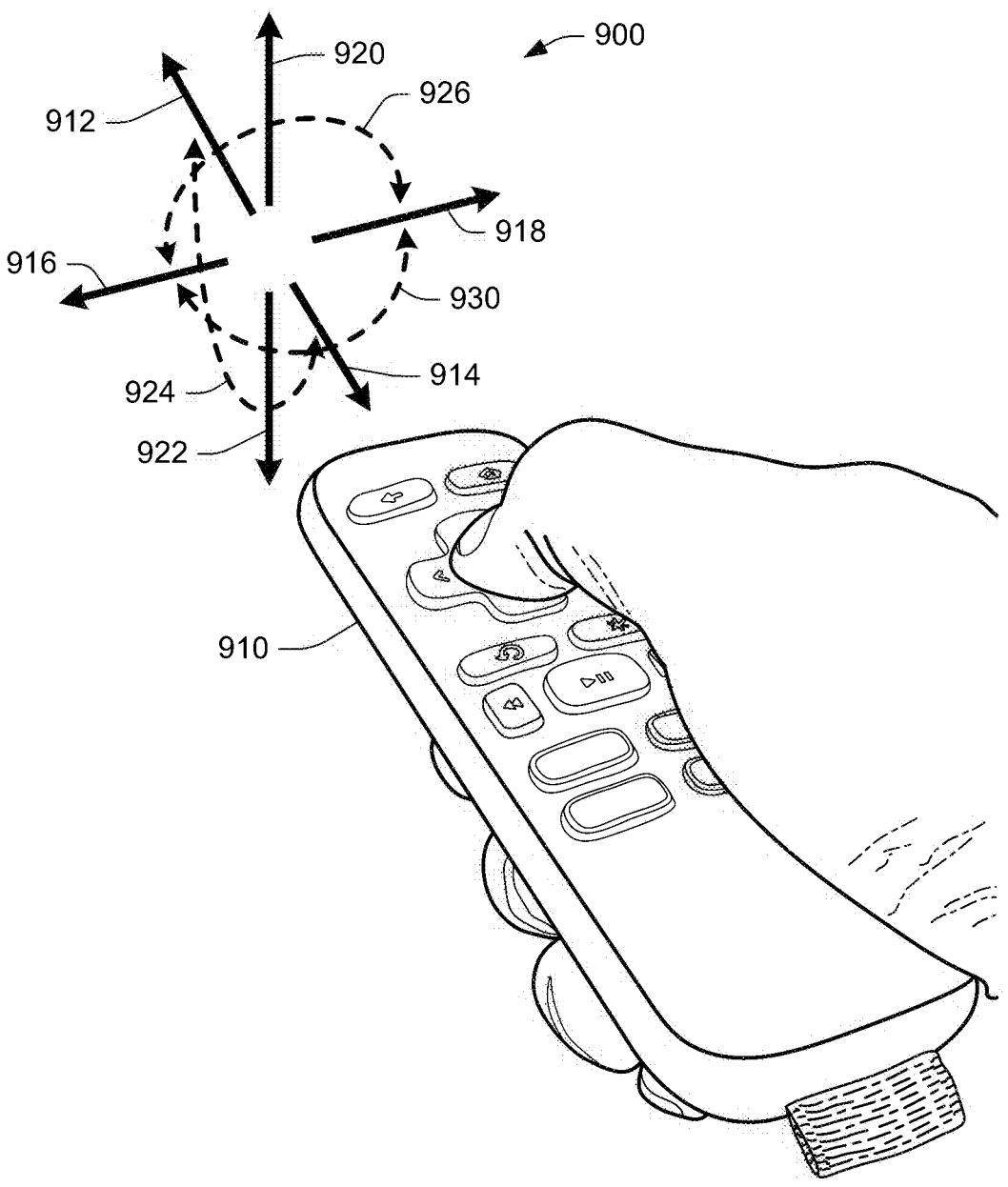
FIG. 9 illustrates an example remote control configured to provide user-characteristic motion data.

Additionally or alternatively, different users may be identified by the different ways that they hold the remote control 110. For example, one user may habitually hold the remote control 110 at a distinguishably different angle from another user, and/or may hold the remote control with a distinctive amount or character of hand movement (e.g., tremor). A remote control 110 can be provided with one or more accelerometers and/or one or more gyroscopes 113 configured to collect remote control holding data. FIG. 9 illustrates an example remote control 910, which can correspond to remote control 110 in FIG. 1. Three-dimensional axis 900 in FIG. 9 shows degrees of freedom over which orientation or motion can be measured by the accelerometers and/or gyroscopes of the remote control 910. For example, measurements may be made that determine some combination of motion forward 912 and backward 914 in a longitudinal axis, left 916 and right 918 in a lateral axis, up 920 and down 922 in a vertical axis, or rotations about these axes as some combination of pitch 924, roll 926, and yaw 930. The remote control 110 and/or media system 104 can be configured to statistically analyze the remote control holding data, and to profile the holding data in ways that can distinguish (or aid in distinguishing) one user from another. In some examples, an input pattern profile and a holding profile can be combined as a remote control usage profile for the user 132.

Data from usage of a mobile device (e.g., a smartphone or smart watch) can be used to infer a user 132 and to switch to a user profile for the user, or to create a new user profile for the user if none exists yet. A mobile device may provide information indicative of proximity to media system 104 in one of several ways. As one example, the mobile device may be logged into a Wi-Fi network as may be provided, for example, by communication device 114. Communication device 114 and media system 104 may thereby detect the presence of the mobile device. As another example, the mobile device may provide location information to the media system 104, e.g., by providing GPS-based geolocation information via a mobile device application installed on the mobile device. The presence of the mobile device can be recorded and tracked by the media device 106, for example, and can be correlated with other data to infer the identity of the user 132.

Histories of pre-selected, previewed, selected, or consumed content can be used to infer the identity of the user 132, e.g., when correlated to remote control data or mobile device data. Additionally or alternatively, camera input and/or microphone input can be used to estimate the identity of the user 132 via image or audio recognition techniques known to those skilled in the art.

One or more of the types of user-identifying information as described above can be provided to a classifier algorithm or model that can estimate or predict the identity of the actual user 132 and, accordingly, can automatically create or switch to an implicit user profile for the user 132. The identity estimation or prediction need not operate based on personally identifying information such as real name. Examples of a classifier algorithm or model or model that can be used can include a machine-learning model such as a support vector machine (SVM) or a neural network. By using implicit user profiling, conflation of user histories, preferences, behaviors, and demographics data with different users in a household can be avoided or eliminated. Accordingly, by using implicit user profiling, micro-descriptors that are generated based on user histories, preferences, behaviors, and/or demographics can properly be displayed to the correct user within the household.

Example Computer System

Figure 10:
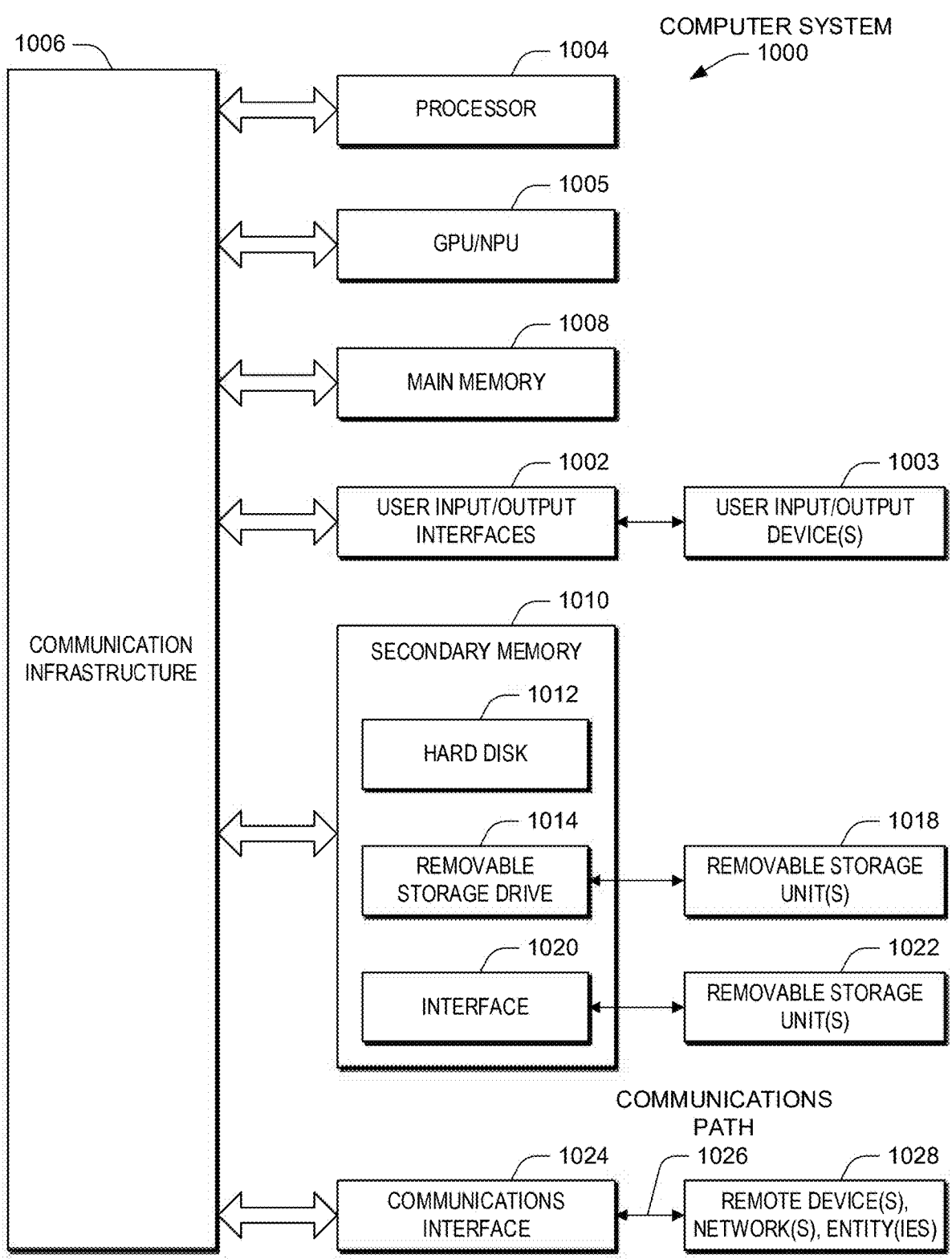
FIG. 10 illustrates an example computer system useful for implementing various embodiments.

Various embodiments may be implemented, for example, using one or more well-known computer systems, such as computer system 1000 shown in FIG. 10. For example, the media device 106, one or more system servers 126, and/or one or more content servers 120 may be implemented using combinations or sub-combinations of computer system 1000. Also or alternatively, one or more computer systems 1000 may be used, for example, to implement any of the embodiments discussed herein, as well as combinations and sub-combinations thereof.

Computer system 1000 may include one or more processors (also called central processing units, or CPUs), such as a processor 1004. The computer system 1000 can also include one or more GPUs and/or NPUs 1005. In an embodiment, a GPU or an NPU may be a processor that is a specialized electronic circuit designed to process mathematically intensive applications. The GPU or NPU may have a parallel structure that is efficient for parallel processing of large blocks of data, such as mathematically intensive data common to computer graphics applications, images, videos, AI models, etc. Both GPUs and NPUs can be used to process AI data, such as inferencing using AI models, faster than a CPU alone. Processor 1004 and/or GPU/NPU 1005 may be connected to a communication infrastructure or bus 1006.

Computer system 1000 may also include user input/output device(s) 1003, such as monitors, keyboards, pointing devices, etc., which may communicate with communication infrastructure 1006 through user input/output interface(s) 1002.

Computer system 1000 may also include a main or primary memory 1008, such as random access memory (RAM). Main memory 1008 may include one or more levels of cache. Main memory 1008 may have stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 may include a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 may read from and/or write to removable storage unit 1018.

Secondary memory 1010 may include other means, devices, components, instrumentalities or other approaches for allowing computer programs and/or other instructions and/or data to be accessed by computer system 1000. Such means, devices, components, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 1000 may further include a communication or network interface 1024. Communication interface 1024 may enable computer system 1000 to communicate and interact with any combination of external devices, external networks, external entities, etc. (individually and collectively referenced by reference number 1028). For example, communication interface 1024 may allow computer system 1000 to communicate with external or remote devices 1028 over communications path 1026, which may be wired and/or wireless (or a combination thereof), and which may include any combination of LANs, WANs, the Internet, etc. Control logic and/or data may be transmitted to and from computer system 1000 via communication path 1026.

Computer system 1000 may also be any of a personal digital assistant (PDA), desktop workstation, laptop or notebook computer, netbook, tablet, smartphone, smart watch or other wearable, appliance, part of the Internet-of-Things, and/or embedded system, to name a few non-limiting examples, or any combination thereof.

Computer system 1000 may be a client or server, accessing or hosting any applications and/or data through any delivery paradigm, including but not limited to remote or distributed cloud computing solutions; local or on-premises software ("on-premises" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1000 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000 or processor(s) 1004), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 10. In particular, embodiments can operate with software, hardware, and/or operating system implementations other than those described herein.

CONCLUSION

Incorporating automatically AI-generated (e.g., LLM-generated) micro-descriptors as described herein into a media content selection GUI, such as a recommendation system of a GUI, can provide various technical and user-centric benefits and advantages of the GUI. In addition to the improvements to the technical field of media content selection graphical user interfaces described above, benefits and advantages include attracting more users to sign up and engage with content options, lowering users' focus-to-click rate, increasing users' click-to-stream rate, and reducing user steps to access content details. Micro-descriptors can quickly provide context on a content details page, boosting streaming hours and monetization.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for generating content recommendation micro-descriptors for use in a content selection graphical user interface (GUI), the computer-implemented method comprising:

determining, by at least one computer processor, whether a content release date derived from stored metadata corresponding to media content in a data store is before a training cutoff date of a generative artificial intelligence (AI) model;

one of:

based on the content release date being before the training cutoff date:

populating a first generative AI prompt template with content metadata of the stored metadata including at least a content title, a content type, and a content release year, to provide a first generative AI prompt, wherein the first generative AI prompt comprises first natural-language instructions configured to cause the generative AI model to generate a first description for the media content;

providing the first generative AI prompt to the generative AI model to generate the first description for the media content;

populating a second generative AI prompt template with at least the first description, to provide a second generative AI prompt, wherein the second generative AI prompt comprises second natural-language instructions configured to cause the generative AI model to generate a second description for the media content based on the first description, wherein the second description is five generative AI tokens or fewer in length; and providing the second generative AI prompt to the generative AI model to generate the second description for the media content; or based on the content release date being after the training cutoff date:

populating a third generative AI prompt template with at least a third description derived from the stored metadata to provide a third generative AI prompt, wherein the third generative AI prompt comprises third natural-language instructions configured to cause the generative AI model to generate a fourth description for the media content based on the third description, wherein the fourth description is five generative AI tokens or fewer in length; and providing the third generative AI prompt to the generative AI model to generate the fourth description for the media content; and displaying the second description or the fourth description in the content selection GUI comprising a plurality of thumbnails of recommended content options, upon a user interaction with a thumbnail of the plurality of thumbnails that is associated with the media content.

2. The computer-implemented method of claim 1, wherein the displayed second description or fourth description is three generative AI tokens or fewer in length.

3. The computer-implemented method of claim 1, wherein the displayed second description or fourth description is exactly three generative AI tokens in length.

4. The computer-implemented method of claim 1, further comprising:

storing the second description or the fourth description in a data store; and providing the stored second description or fourth description as training metadata to train a machine learning model of a content recommendation engine.

5. The computer-implemented method of claim 1, wherein the AI generation of the second description or the fourth description is performed substantially in real time upon the user interaction with the thumbnail.

6. The computer-implemented method of claim 1, wherein the first description is between about 100 words and about 500 words in length.

7. The computer-implemented method of claim 1, wherein the displayed second description or fourth description is further generated by the generative AI model based on user data associated with a user of the content selection GUI.

8. A system for generating content recommendation micro-descriptors for use in a content selection graphical user interface (GUI), comprising:

one or more memories; and at least one processor each coupled to at least one of the one or more memories and configured to perform operations comprising:

determining whether a content release date derived from stored metadata corresponding to media content in a data store is before a training cutoff date of a generative artificial intelligence (AI) model;

one of:

based on the content release date being before the training cutoff date:

populating a first generative AI prompt template with content metadata of the stored metadata including at least a content title, a content type, and a content release year, to provide a first generative AI prompt, wherein the first generative AI prompt comprises first natural-language instructions configured to cause the generative AI model to generate a first description for the media content;

providing the first generative AI prompt to the generative AI model to generate the first description for the media content;

populating a second generative AI prompt template with at least the first description, to provide a second generative AI prompt, wherein the second generative AI prompt comprises second natural-language instructions configured to cause the generative AI model to generate a second description for the media content based on the first description, wherein the second description is five generative AI tokens or fewer in length; and providing the second generative AI prompt to the generative AI model to generate the second description for the media content; or based on the content release date being after the training cutoff date:

populating a third generative AI prompt template with at least a third description derived from the stored metadata to provide a third generative AI prompt, wherein the third generative AI prompt comprises third natural-language instructions configured to cause the generative AI model to generate a fourth description for the media content based on the third description, wherein the fourth description is five generative AI tokens or fewer in length; and providing the third generative AI prompt to the generative AI model to generate the fourth description for the media content; and displaying the second description or the fourth description in the content selection GUI comprising a plurality of thumbnails of recommended content options, upon a user interaction with a thumbnail of the plurality of thumbnails that is associated with the media content.

9. The system of claim 8, wherein the displayed second description or fourth description is three generative AI tokens or fewer in length.

10. The system of claim 8, wherein the displayed second description or fourth description is exactly three generative AI tokens in length.

11. The system of claim 8, wherein the operations further comprise:

storing the second description or the fourth description in a data store; and providing the stored second description or fourth description as training metadata to train a machine learning model of a content recommendation engine.

12. The system of claim 8, wherein the AI generation of the second description or the fourth description is performed substantially in real time upon the user interaction with the thumbnail.

13. The system of claim 8, wherein the first description is between about 100 words and about 500 words in length.

14. The system of claim 8, wherein the displayed second description or fourth description is further generated by the generative AI model based on user data associated with a user of the content selection GUI.

15. A non-transitory computer-readable medium having instructions stored thereon that, when executed by at least one computing device, cause the at least one computing device to perform operations for generating content recommendation micro-descriptors for use in a content selection graphical user interface (GUI), the operations comprising:

determining whether a content release date derived from stored metadata corresponding to media content in a data store is before a training cutoff date of a generative artificial intelligence (AI) model;

one of:

based on the content release date being before the training cutoff date:

populating a first generative AI prompt template with content metadata of the stored metadata including at least a content title, a content type, and a content release year, to provide a first generative AI prompt, wherein the first generative AI prompt comprises first natural-language instructions configured to cause the generative AI model to generate a first description for the media content;

providing the first generative AI prompt to the generative AI model to generate the first description for the media content;

populating a second generative AI prompt template with at least the first description, to provide a second generative AI prompt, wherein the second generative AI prompt comprises second natural-language instructions configured to cause the generative AI model to generate a second description for the media content based on the first description, wherein the second description is five generative AI tokens or fewer in length; and providing the second generative AI prompt to the generative AI model to generate the second description for the media content; or based on the content release date being after the training cutoff date:

populating a third generative AI prompt template with at least a third description derived from the stored metadata to provide a third generative AI prompt, wherein the third generative AI prompt comprises third natural-language instructions configured to cause the generative AI model to generate a fourth description for the media content based on the third description, wherein the fourth description is five generative AI tokens or fewer in length; and providing the third generative AI prompt to the generative AI model to generate the fourth description for the media content; and displaying the second description or the fourth description in the content selection GUI comprising a plurality of thumbnails of recommended content options, upon a user interaction with a thumbnail of the plurality of thumbnails that is associated with the media content.

16. The non-transitory computer-readable medium of claim 15, wherein the displayed second description or fourth description is three generative AI tokens or fewer in length.

17. The non-transitory computer-readable medium of claim 15, wherein the displayed second description or fourth description is exactly three generative AI tokens in length.

18. The non-transitory computer-readable medium of claim 15, wherein the operations further comprise:

storing the second description or the fourth description in a data store; and providing the stored second description or fourth description as training metadata to train a machine learning model of a content recommendation engine.

19. The non-transitory computer-readable medium of claim 15, wherein the AI generation of the second description or the fourth description is performed substantially in real time upon the user interaction with the thumbnail.

20. The non-transitory computer-readable medium of claim 15, wherein the displayed second description or fourth description is further generated by the generative AI model based on user data associated with a user of the content selection GUI.

* * * * *